(12) United States Patent
Kikushima et al.

(10) Patent No.: US 7,865,085 B2
(45) Date of Patent: Jan. 4, 2011

(54) OPTICAL TRANSMITTING DEVICE, OPTICAL TRANSMISSION SYSTEM, OPTICAL TRANSMITTING METHOD AND OPTICAL TRANSMISSION METHOD

(75) Inventors: Koji Kikushima, Chiba (JP); Satoshi Ikeda, Chiba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 229 days.

(21) Appl. No.: 10/590,055

(22) PCT Filed: Nov. 10, 2005

(86) PCT No.: PCT/JP2005/020597

§ 371 (c)(1), (2), (4) Date: Aug. 21, 2006

(87) PCT Pub. No.: WO2006/051849

PCT Pub. Date: May 18, 2006

(65) Prior Publication Data

US 2007/0206956 A1 Sep. 6, 2007

(30) Foreign Application Priority Data

Nov. 11, 2004 (JP) .............................. 2004-328047

(51) Int. Cl.
H04B 10/04 (2006.01)
(52) U.S. Cl. ..................... 398/183; 398/184; 398/187; 398/192; 398/194
(58) Field of Classification Search ................. 398/192, 398/194
See application file for complete search history.

(56) References Cited

U.S. PATENT DOCUMENTS 5,161,044 A * 11/1992 Nazarathy et al. ........... 398/194

(Continued)

FOREIGN PATENT DOCUMENTS

JP 54048414 4/1979

(Continued)

OTHER PUBLICATIONS

ITU-T Recommendation, J. 185, Transmission equipment for transferring multi-channel telelvision signals over optical access networks by FM conversion, Feb. 2002.*

(Continued)

Primary Examiner—Ken N Vanderpuye
Assistant Examiner—Tanya Ngo
(74) Attorney, Agent, or Firm—Fitch, Even, Tabin & Flannery

(57) ABSTRACT

In an optical transmission system by frequency-division multiplexing, the interference due to distortions of a first signal against a second signal can be reduced. In the optical transmission system where a modulated optical signal by the first signal is further modulated with the second signal for transmission, distortions of the first signal corresponding to a frequency band of the second signal is extracted. The extracted signal is phase-inverted and then adjusted in phase and amplitude with respect to the distortions of the first signal to obtain a correction signal. By intensity-modulating the first signal containing the distortions by the correction signal, the distortions of the first signal against the second signal can be cancelled out. Alternatively, by intensity-modulating the first signal containing the distortions by a combined signal of the correction signal and the second signal, the distortions of the first signal against the second signal can be cancelled out.

13 Claims, 31 Drawing Sheets

U.S. PATENT DOCUMENTS

| | | | | | |
|---|---|---|---|---|---|
| 5,303,393 | A | * | 4/1994 | Noreen et al. | 455/3.02 |
| 5,422,681 | A | * | 6/1995 | Hayashi | 348/730 |
| 5,430,568 | A | * | 7/1995 | Little et al. | 398/81 |
| 5,515,199 | A | * | 5/1996 | Farina | 359/326 |
| 5,739,934 | A | * | 4/1998 | Nomura et al. | 398/79 |
| 5,812,297 | A | * | 9/1998 | Mussino et al. | 398/198 |
| 6,005,701 | A | * | 12/1999 | Hardy et al. | 398/192 |
| 6,061,161 | A | * | 5/2000 | Yang et al. | 398/194 |
| 6,366,712 | B1 | * | 4/2002 | Buabbud et al. | 385/15 |
| 6,473,013 | B1 | * | 10/2002 | Velazquez et al. | 341/120 |
| 6,643,470 | B1 | | 11/2003 | Iida et al. | |
| 7,200,339 | B1 | * | 4/2007 | Roberts et al. | 398/159 |
| 2005/0239406 | A1 | * | 10/2005 | Shattil | 455/63.1 |
| 2005/0244155 | A1 | * | 11/2005 | Kikushima | 398/41 |
| 2007/0206956 | A1 | * | 9/2007 | Kikushima et al. | 398/183 |
| 2007/0212073 | A1 | * | 9/2007 | Kikushima et al. | 398/79 |

FOREIGN PATENT DOCUMENTS

| | | | |
|---|---|---|---|
| JP | 06-104867 | * | 4/1994 |
| JP | 08-065247 | | 3/1996 |
| JP | 10-511186 | | 10/1998 |
| JP | 2001-015243 | * | 2/2001 |
| JP | 2001-051243 | | 2/2001 |
| JP | 2001197004 | | 7/2001 |
| JP | 3339031 | * | 8/2002 |
| JP | 3339031 | * | 11/2002 |
| JP | 2003-524313 | | 8/2003 |
| WO | WO 2006009197 A1 | * | 1/2006 |

OTHER PUBLICATIONS

Shibata, et al., Optical video distribution systems employing FM conversion, Transaction B of the Institute of Electronics, Information and Communication Engineers, vol. J83-B, No. 7, pp. 948-959, Jul. 2000.

ITU-T Recommendation, J.185, Transmission equipment for transferring multi-channel television signals over optical access networks by FM conversion, Feb. 2002.

* cited by examiner

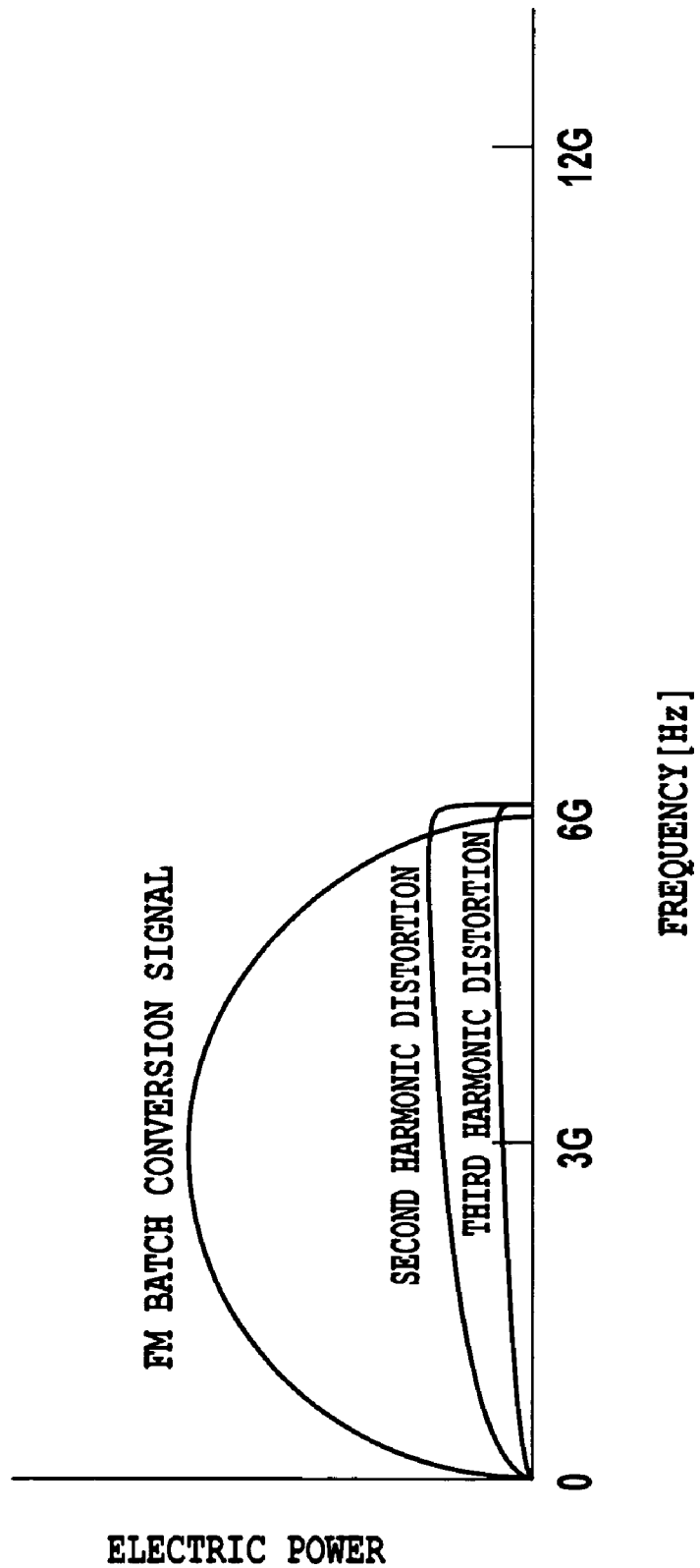

ОПТICAL TRANSMITTING DEVICE, OPTICAL TRANSMISSION SYSTEM, OPTICAL TRANSMITTING METHOD AND OPTICAL TRANSMISSION METHOD

TECHNICAL FIELD

The present invention relates to a transmission of an optical signal with frequency division multiplexing. More particularly, the present invention relates to a transmission of an optical signal through a frequency division multiplexing system that, by reducing distortions due to a first signal, mitigates interference against a second signal.

BACKGROUND ART

A method has been invented, which transmits first and second signals with frequency multiplexing, through modulating an optical signal being intensity-modulated by the first signal with the second signal composed of other signal using an external modulator (Patent Document 1).

However, in an optical transmitting device shown in FIG. 3 of Patent Document 1, a frequency allocation for an AM-FDM signal (a first signal) and an FM-FDM signal (a second signal) are as shown in FIG. 6 of Patent Document 1. In this case, harmonic distortions and intermodulation distortions of the AM-FDM signal may overlap with the FM-FDM signal frequency, and may interfere the FM-FDM signal.

As such, in a frequency division multiplexing system, when modulating the modulated optical signal by the first signal with the second signal using the external modulator to multiplex the first and second signals with frequency-division, a problem arises that the harmonic distortions and intermodulation distortions generated by the first signal can interfere the second signal.

Patent Document 1: Japanese Patent Application Laid-Open No. 6-104867.
Non-Patent Document 1: ITU-T Recommendation, J.185, "Transmission equipment for transferring multi-channel television signals over optical access networks by FM conversion", February 2002.
Non-Patent Document 2: Shibata et al., "Optical video distribution systems employing FM conversion", Transaction B of the Institute of Electronics, Information and Communication Engineers, Vol. J83-B, No. 7, pp. 948-959, July 2000.

DISCLOSURE OF THE INVENTION

The present invention has been made in view of the foregoing problem, and its object is to reduce interfering distortions in an optical transmission with frequency division multiplexing and facilitate a higher-quality transmission.

According to an aspect of the present invention, an optical transmitting device of modulating a modulated optical signal by a first signal with a second signal for transmission, the device comprises an optical splitting means for splitting the modulated optical signal by the first signal, a photoelectric conversion means for converting one of the split optical signals to an electrical signal, and a cancellation means for canceling interference against the second signal contained in the other of the split optical signals, by using the converted electrical signal.

Further, according to an aspect of the present invention, the cancellation means comprises a filter means for extracting an electrical signal of a frequency spectrum at least partially overlapped with a frequency spectrum of the second signal in the converted electrical signal, a phase adjustment means for adjusting a phase of the extracted electrical signal, and a modulation means for modulating the other of the split optical signals with the phase-adjusted electrical signal.

Furthermore, according to an aspect of the present invention, the cancellation means comprises a filter means for extracting an electrical signal of a frequency spectrum at least partially overlapped with a frequency spectrum of the second signal in the converted electrical signal, a phase adjustment means for adjusting a phase of the extracted electrical signal, a combining means for combining the phase-adjusted electrical signal and the second signal, and a modulation means for modulating the other of the split optical signals with the combined signal.

Still further, according to an aspect of the present invention, the first signal is an FM batch converted signal.

Still furthermore, according to an aspect of the present invention, the second signal is a satellite broadcasting RF signal.

In addition, according to an aspect of the present invention, an optical transmission system comprising an optical transmitting device and an optical receiving device for receiving an optical signal transmitted via an optical path from the optical transmitting device, the optical receiving device comprises an optical splitting means for splitting the received optical signal to an optical signal containing an FM batch converted signal and an optical signal containing a satellite broadcasting RF signal, a first photoelectric conversion means for converting the optical signal containing the FM batch conversion signal split by the optical splitting means to an electrical signal, a demodulation means for FM demodulating the electrical signal converted by the first photoelectric conversion means, a second photoelectric conversion means for converting the optical signal containing the satellite broadcasting RF signal split by the optical splitting means to an electrical signal, and a down-conversion means for down-converting the electrical signal converted by the second photoelectric conversion means.

Moreover, according to an aspect of the present invention, an optical transmission system comprising an optical transmitting device and an optical receiving device for receiving an optical signal transmitted via an optical path from the optical transmitting device, the optical receiving device comprises a photoelectric conversion means for converting the received optical signal to an electrical signal, a filter means for separating the electrical signal converted by the photoelectric conversion means to a FM batch converted signal and a satellite broadcasting RF signal, a demodulation means for demodulating the FM batch conversion signal separated by the filter means, and a down-conversion means for down-converting the satellite broadcasting RF signal separated by the filter means.

In addition, according to an aspect of the present invention, an optical transmitting method for modulating a modulated optical signal by a first signal with a second signal for transmission, the method comprises splitting the modulated optical signal by the first signal, converting one of the split optical signals to an electrical signal, and canceling interference against the second signal contained in the other of the split optical signals using the converted electrical signal.

Further, according to an aspect of the present invention, the canceling step comprises extracting an electrical signal of a frequency spectrum at least partially overlapped with a frequency spectrum of the second signal in the converted electrical signal, adjusting a phase of the extracted electrical signal, and modulating the other of the split optical signals with the phase-adjusted electrical signal.

Furthermore, according to an aspect of the present invention, the canceling step comprises extracting an electrical signal of a frequency spectrum at least partially overlapped with a frequency spectrum of the second signal in the converted electrical signal, adjusting a phase of the extracted electrical signal, combining the phase-adjusted electrical signal and the second signal, and modulating the other of the split optical signals with the combined signal.

Still further, according to an aspect of the present invention, the first signal is an FM batch converted signal.

Still furthermore, according to an aspect of the present invention, the second signal is a satellite broadcasting RF signal.

Moreover, according to an aspect of the present invention, an optical transmission method comprises transmitting a modulated optical signal by an FM batch converted signal and a satellite broadcasting RF signal by the above described optical transmitting method, receiving and splitting the transmitted optical signal to an optical signal containing the FM batch converted signal and an optical signal containing the satellite broadcasting RF signal, converting the optical signal containing the split FM batch converted signal to an electrical signal for demodulation, and converting the optical signal containing the split satellite broadcasting RF signal to an electrical signal for down-conversion.

In addition, according to an aspect of the present invention, an optical transmission method comprises transmitting a modulated optical signal by an FM batch converted signal and a satellite broadcasting RF signal by the above described optical transmission method, receiving and converting the transmitted optical signal to an electrical signal, separating the converted electrical signal to the FM batch converted signal and the satellite broadcasting RF signal, demodulating the separated FM batch conversion signal, and down-converting the separated satellite broadcasting RF signal.

BRIEF DESCRIPTION OF THE DRAWINGS

FIG. 31 is a graph representing a spectrum at point "k" of FIG. 19.

BEST MODE FOR CARRYING OUT THE INVENTION

With reference to the drawings, embodiments of the present invention will be described in detail below. Hereunder, an FM batch conversion signal with a frequency of 0 to 6 GHz converted from CATV signals (90 to 770 MHz) is assumed as a first signal and RF signals of a BS/CS satellite broadcasting with a frequency of 11.7 to 12.8 GHz is assumed as a second signal. In the present invention, however, any signals may be used and the application is not limited to those described below, unless the first and the second signals have different occupied frequencies and are in a relationship that harmonic distortions or intermodulation distortions of the first signal can interfere with the second signal.

As a scheme for transmitting multichannel video signals (90 to 770 MHz) such as CATV signals via an optical fiber with higher quality, an FM batch conversion scheme is recommended by ITU (Non-Patent Document 1). The FM batch conversion scheme can improve a receiving sensitivity through a wideband gain obtained by FM conversion, compared with a scheme that intensity-modulates multichannel video signals for transmission, and thus enables a transmission with higher-quality (Non-Patent Document 2).

Figure 1:
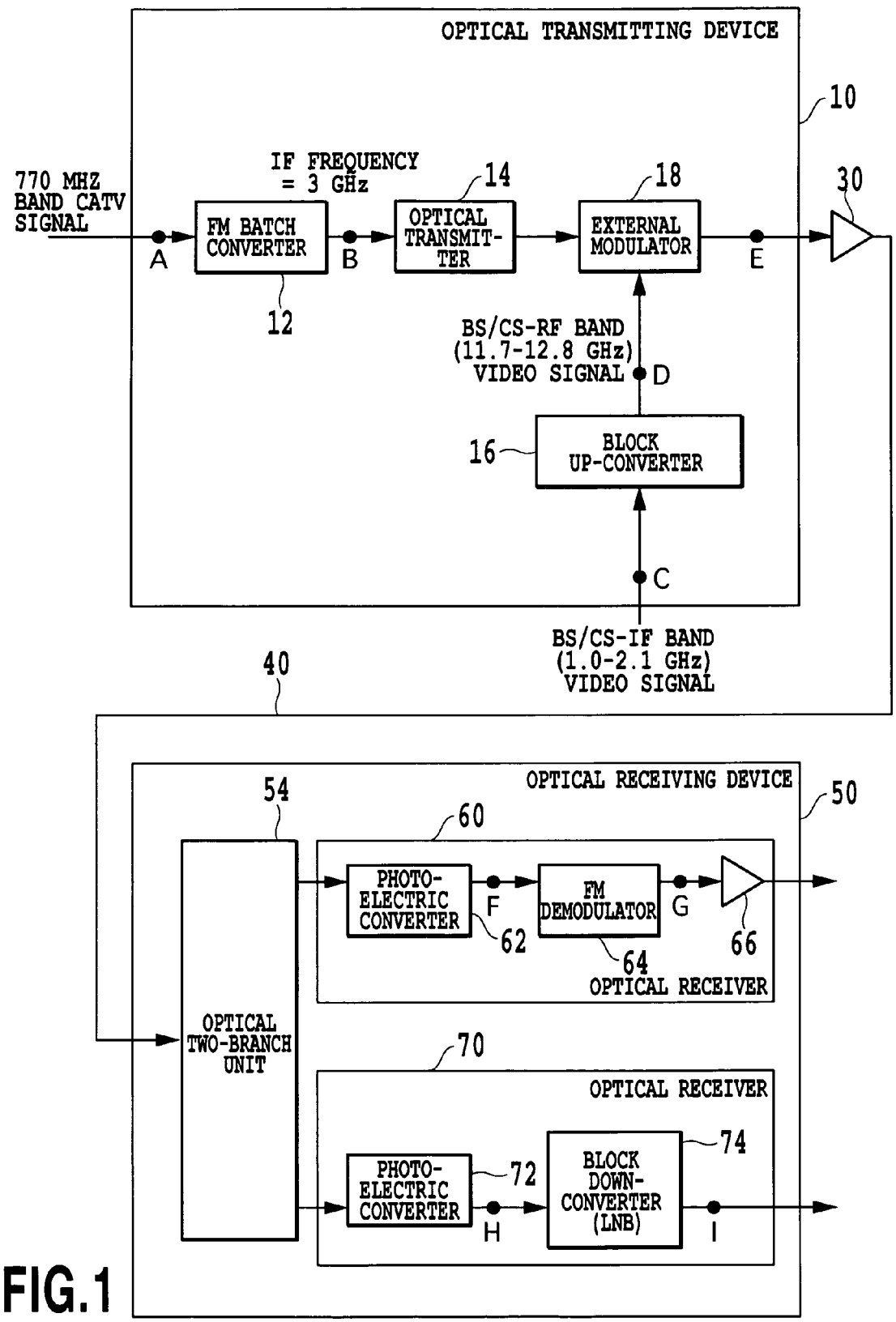
FIG. 1 is a block diagram showing an exemplary configuration of an optical transmission system which performs frequency-multiplexing of a first and a second signals for transmission.

FIG. 1 shows an exemplary configuration of an optical transmission system where multichannel CATV signals of 90 to 770 MHz are converted to an FM batch conversion signal of 0 to 6 GHz and transmitted with multichannel video signals of the BS/CS satellite broadcasting through a single optical fiber.

In an optical transmitting device 10 of FIG. 1, the CATV signals with a frequency of 90 to 770 MHz are frequency-modulated and converted to an FM batch conversion signal (0 to 6 GHz) with a center frequency of 3 GHz and a frequency bandwidth of 6 GHz by an FM batch converter 12. In an optical transmitter 14, an optical signal is intensity-modulated by the FM batch conversion signal for output as an optical signal.

The intensity-modulated optical signal is further intensity-modulated in an external modulator 18 by signals in an RF band of the BS/CS satellite broadcasting. The optical signal is amplified by an optical amplifier 30 as needed and then transmitted via an optical fiber 40 to an optical receiving device 50 at a subscriber.

In the optical receiving device 50, the optical signal is split by an optical two-branch unit 54. These optical signals are converted to electrical signals by photoelectric converters 62 and 72, respectively, such as a photodiode (PD) or an avalanche photodiode (APD).

The electrical signal containing the FM batch conversion signal of the CATV signals is demodulated to the CATV signals with a frequency of 90 to 770 MHz by an FM demodulator 64 for output via an amplifier 66. On the other hand, the electrical signal containing the BS/CS-RF signals is frequency-converted to BS/CS-IF signals with a frequency of 1.0 to 2.1 GHz by a block down-converter (LNB) 74 for output. Because the optical receiving device uses the optical two-branch unit 54, hereinafter it will be referred to as "a branch type optical receiving device".

Figure 2:
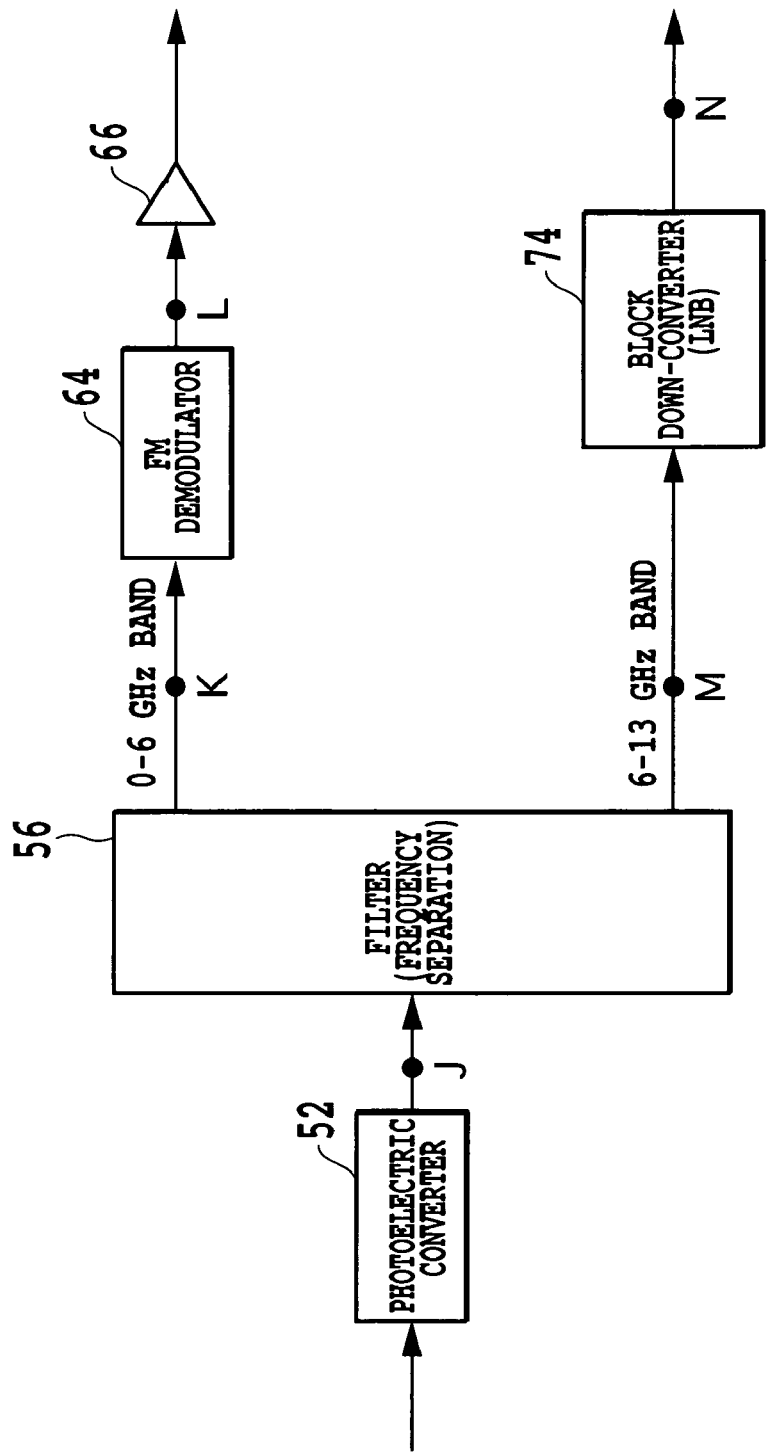
FIG. 2 is a block diagram showing an exemplary configuration of another optical receiving device in an optical transmission system which performs frequency-multiplexing of a first and a second signals for transmission.

As opposed to splitting and converting the optical signal to the electrical signal as shown in FIG. 1, the optical signal may be converted to an electrical signal and then frequency separated as shown in FIG. 2. In FIG. 2, the optical signal received via the optical fiber 40 is firstly converted to the electrical signal by the photoelectric converter 62.

Then, the electrical signal is frequency-separated to a signal containing the FM batch conversion signal of the CATV signals below 6 GHz and a signal having 6 GHz or higher (6 to 13 GHz) through a frequency separating filter 56.

The FM batch conversion signal with a frequency of 0 to 6 GHz is demodulated into the CATV signals with a frequency of 90 to 770 MHz by the FM demodulator 64 for output via the amplifier 66. On the other hand, for the signal with a frequency of 6 to 13 GHz, a desired RF frequency (11.7 to 12.8 GHz) of the BS/CS satellite broadcasting is selected through a filter in the block down-converter (LNB) 74 and frequency-converted to an IF frequency (1.0 to 2.1 GHz) of the BS/CS satellite broadcasting.

Figure 7:
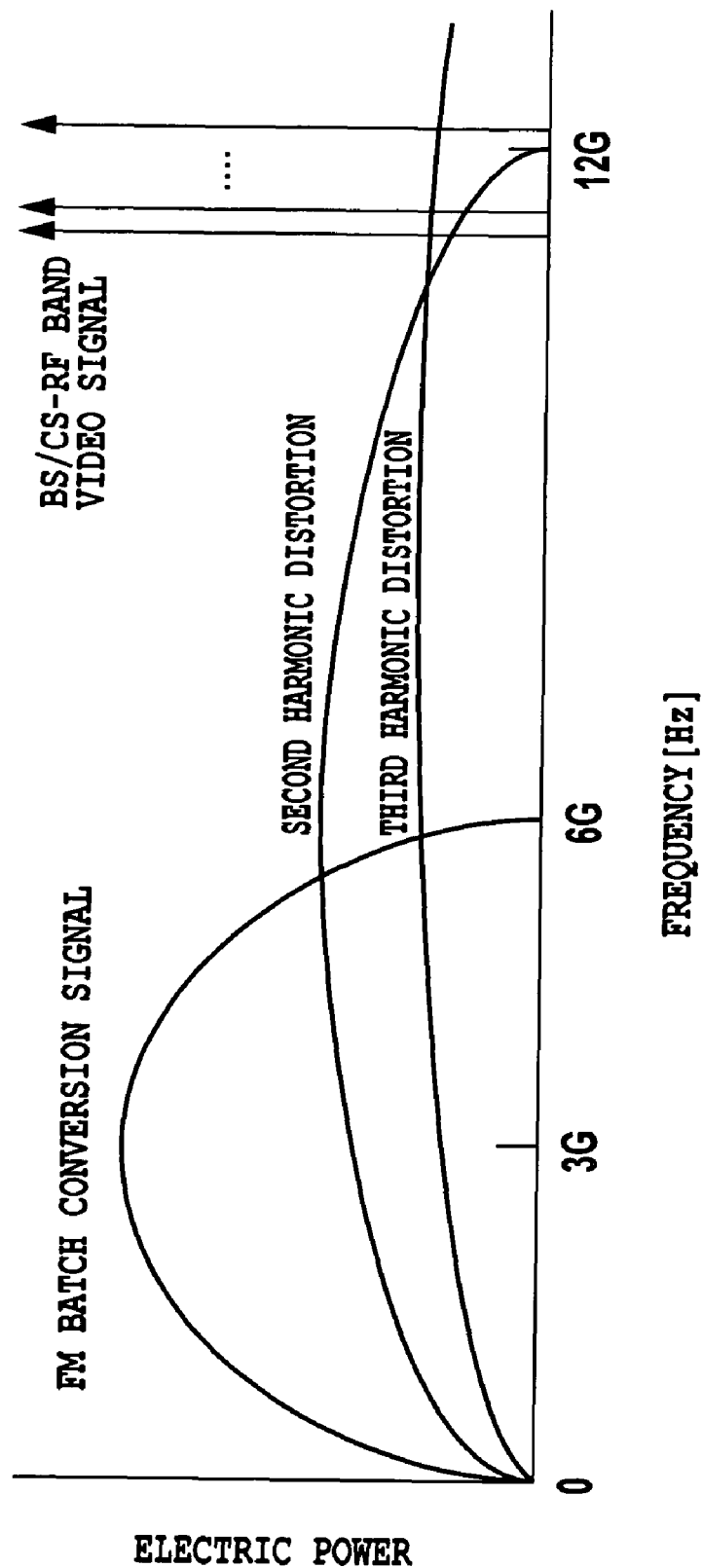
FIG. 7 is a graph representing a spectrum at point "E" of FIG. 1.
Figure 8:
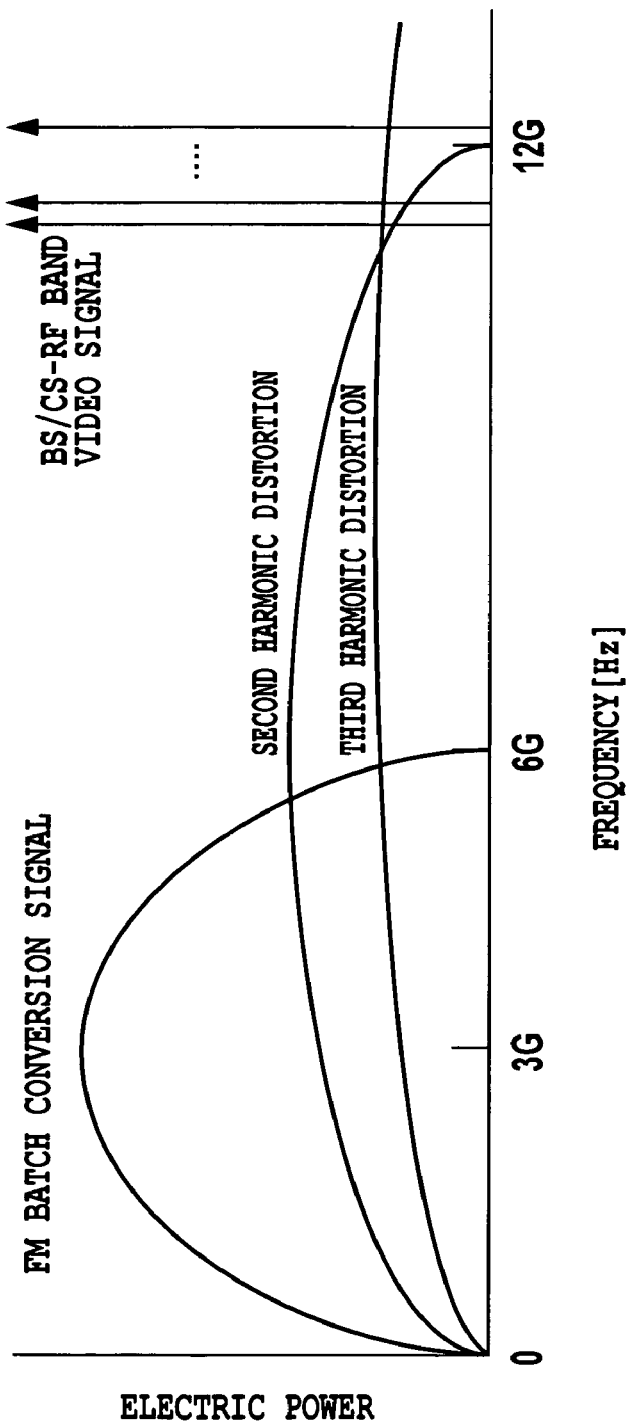
FIG. 8 is a graph representing a spectrum at point "F" of FIG. 1.

Now, a spectrum at each of the points in the exemplary configuration will be described. The spectra at points "A" to "I" of FIG. 1 are shown in FIGS. 3 to 11, respectively. Note that since the signal at point "E" is an optical signal, a frequency spectrum of the electrical signal after photo-electrically converted the optical signal is shown in FIG. 7. Also, the spectra at points "J" to "N" of FIG. 2 are shown in FIGS. 12 to 16, respectively.

Figure 4:
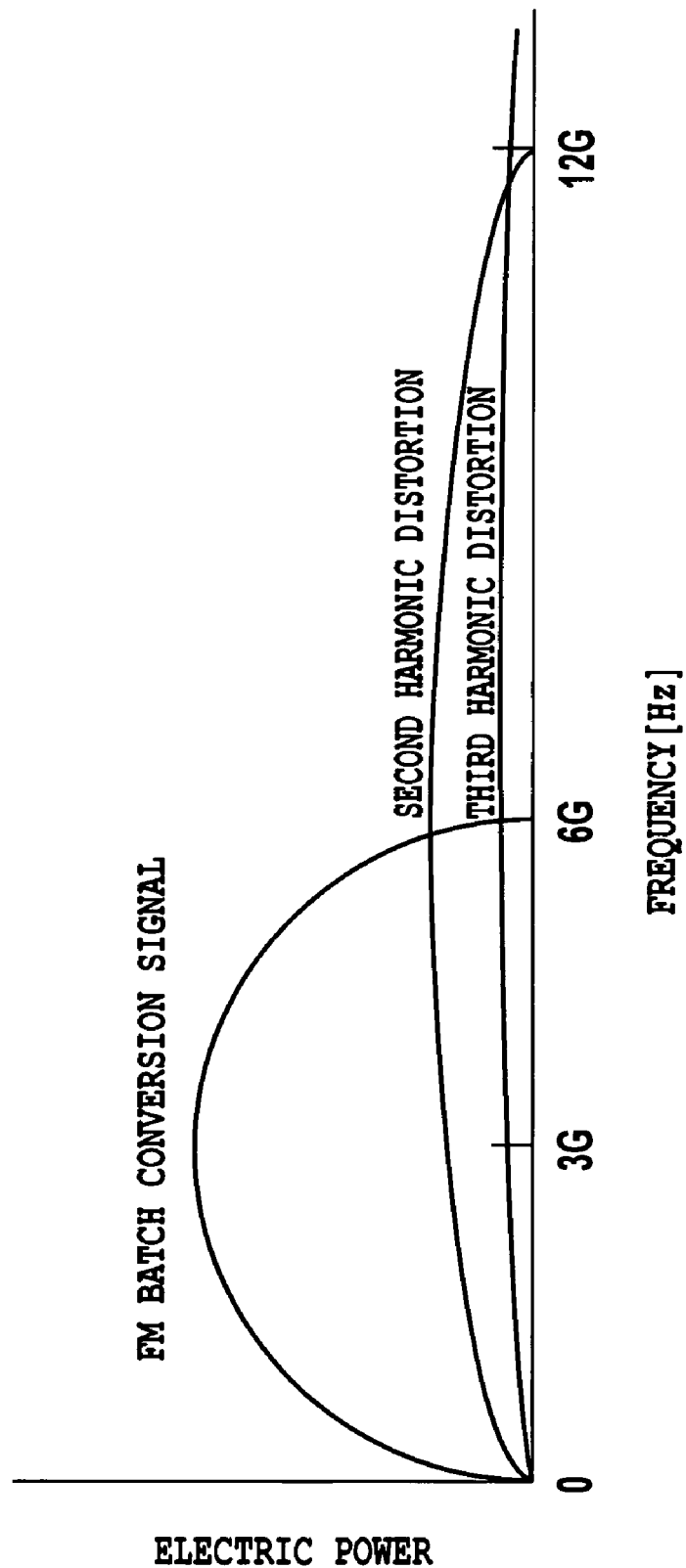
FIG. 4 is a graph representing a spectrum at point "B" of FIG. 1.
Figure 5:
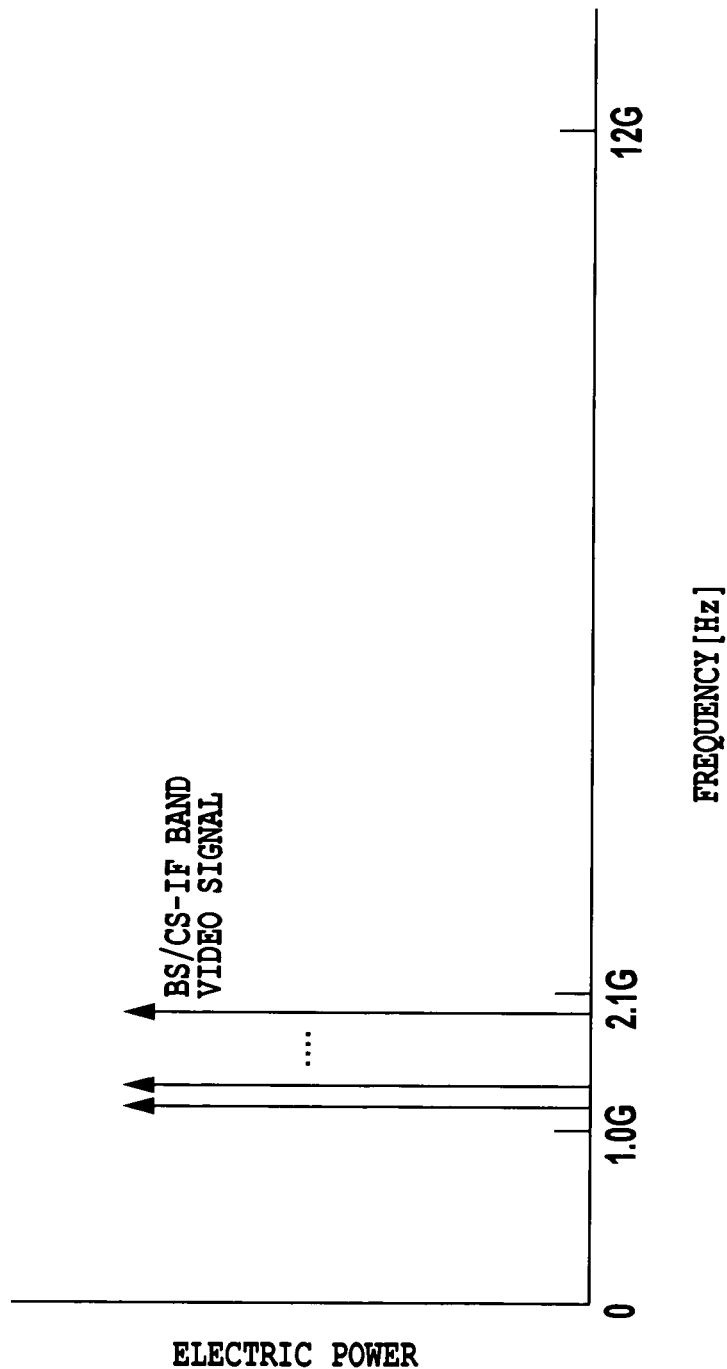
FIG. 5 is a graph representing a spectrum at point "C" of FIG. 1.
Figure 6:
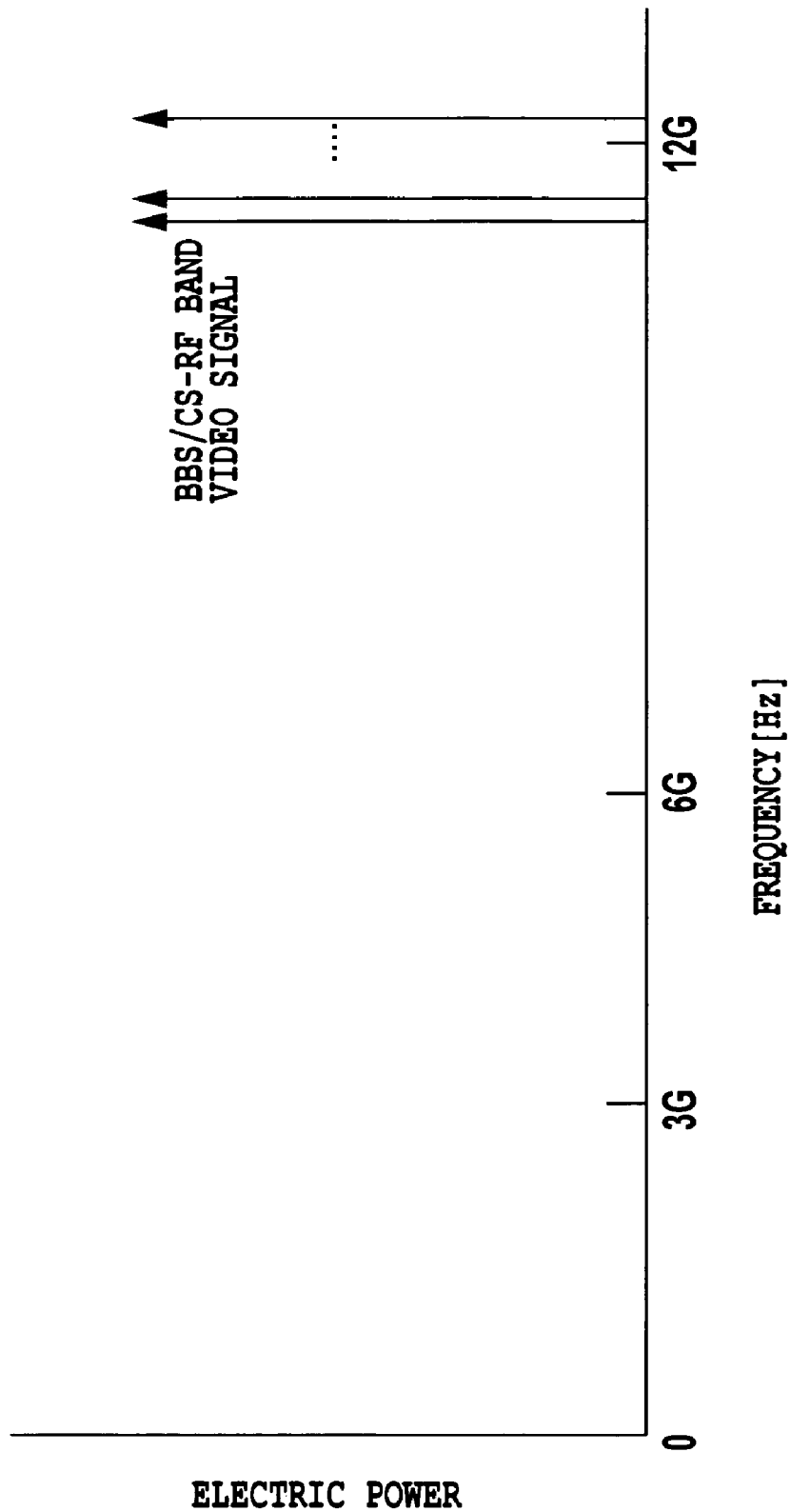
FIG. 6 is a graph representing a spectrum at point "D" of FIG. 1.

Firstly, the branch type optical receiving device of FIG. 1 will be described. As shown in FIG. 4, second and third harmonic distortions are generated by the FM batch converter 12 at point "B" of FIG. 1. These distortions are further increased at point "E" of FIG. 1 by the optical transmitter 14, as shown in FIG. 7.

Figure 9:
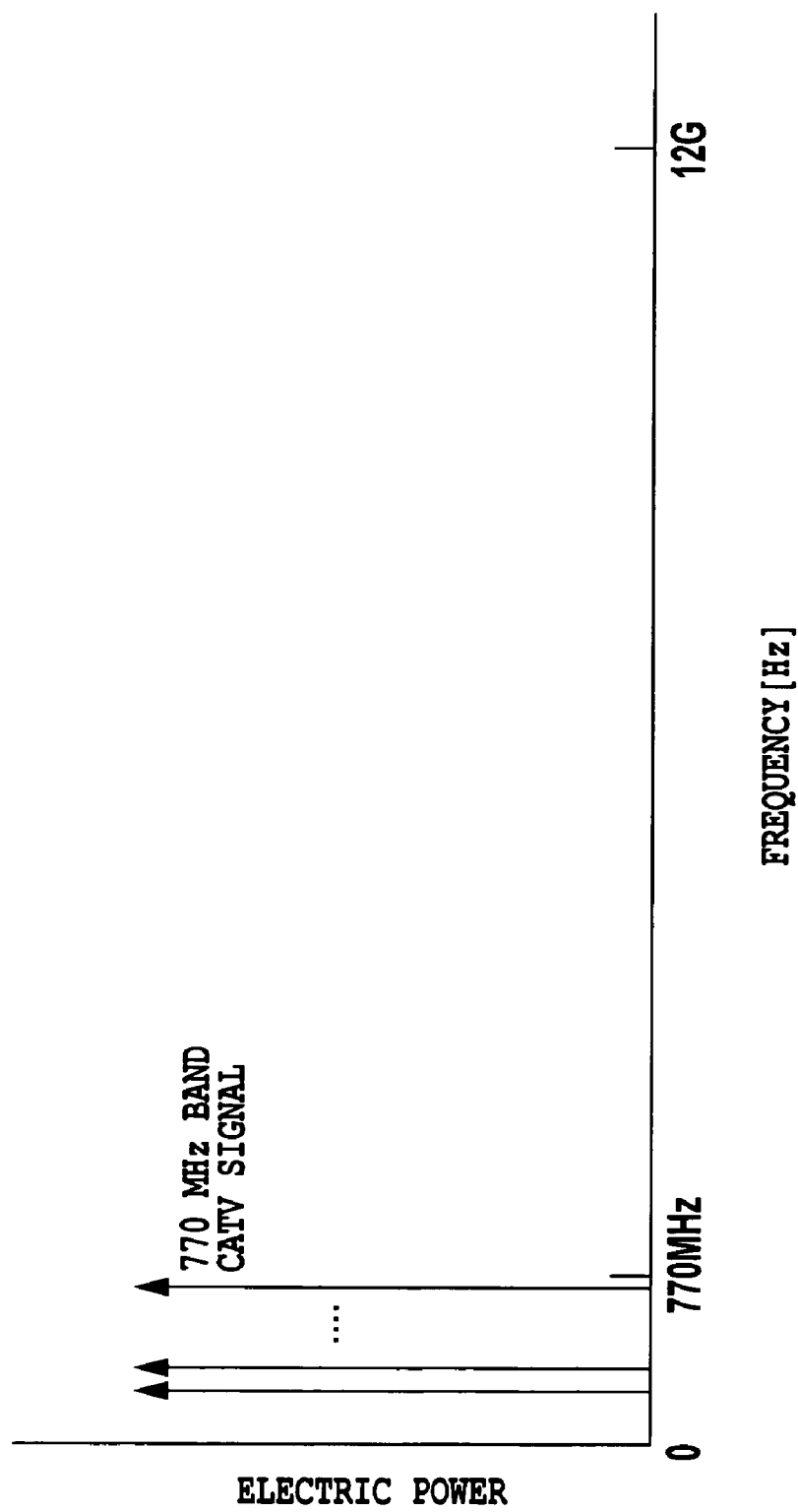
FIG. 9 is a graph representing a spectrum at point "G" of FIG. 1.
Figure 10:
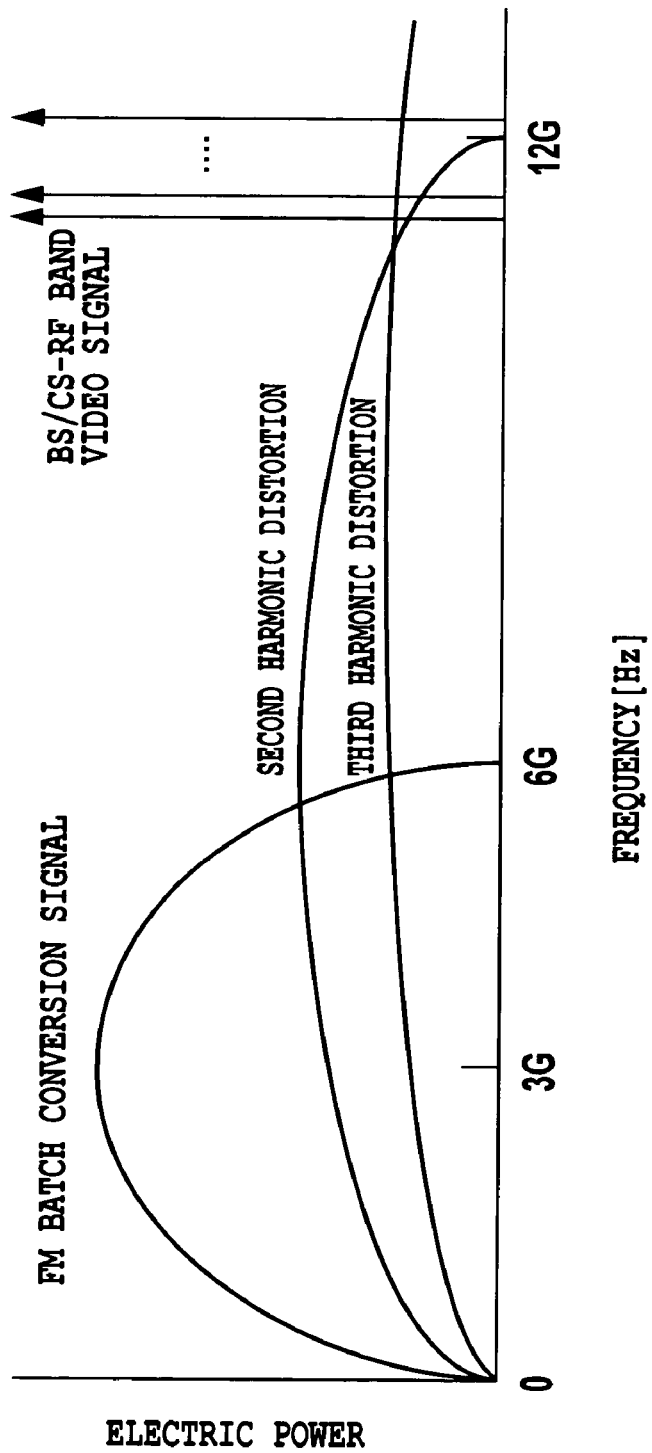
FIG. 10 is a graph representing a spectrum at point "H" of FIG. 1.

The FM batch conversion signal is demodulated by the FM demodulator 64 in the optical receiver 60 and, as shown in FIG. 9, the CATV signals can be restored without degradation at point "G" (refer to Non-Patent Document 2). As shown in FIG. 10, however, second and third harmonic distortions of the FM batch conversion signal fall within the band (11.7 to 12.8 GHz) of the BS/CS-RF signal at point "H".

Figure 11:
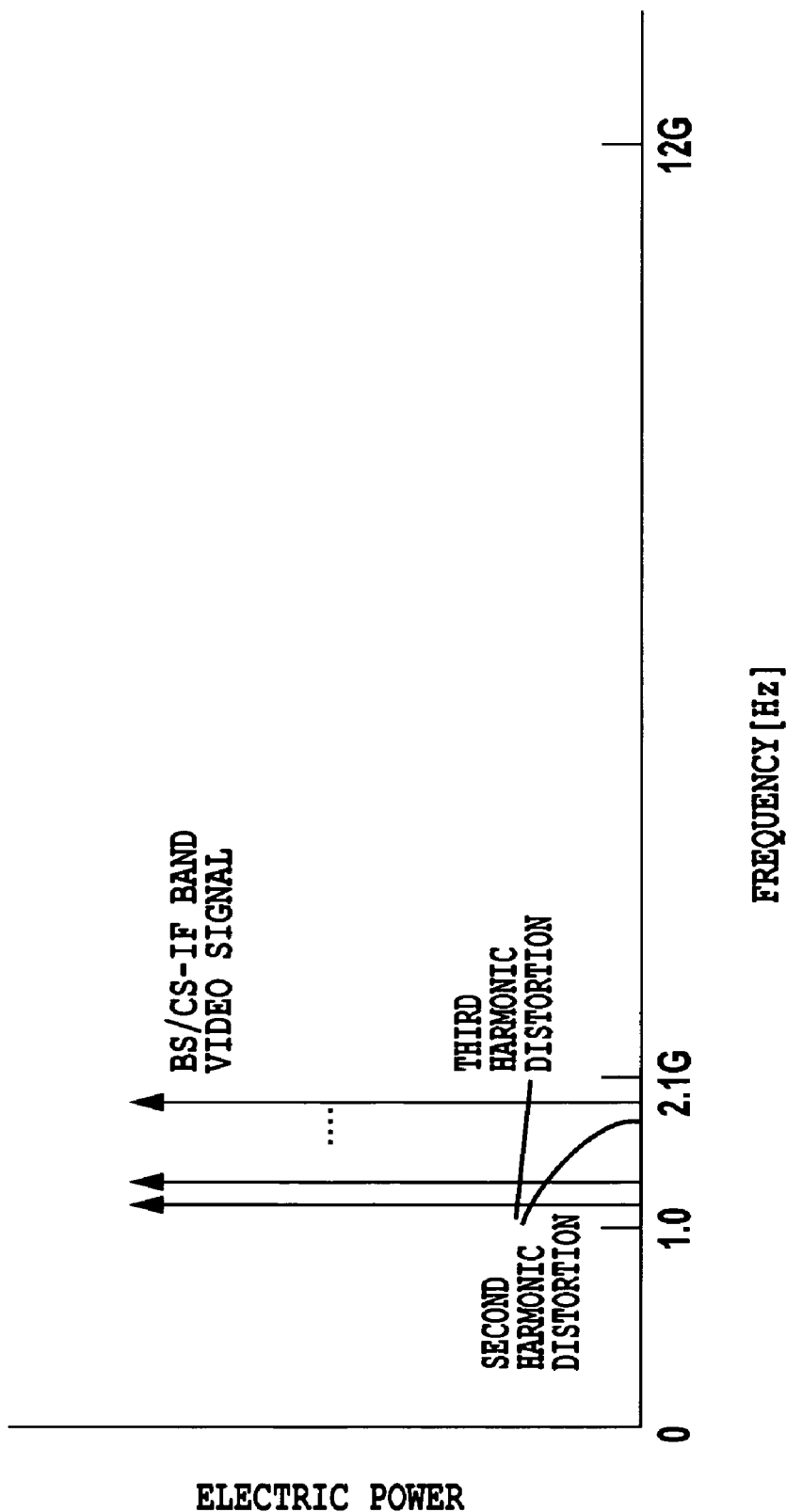
FIG. 11 is a graph representing a spectrum at point "I" of FIG. 1.
Figure 12:
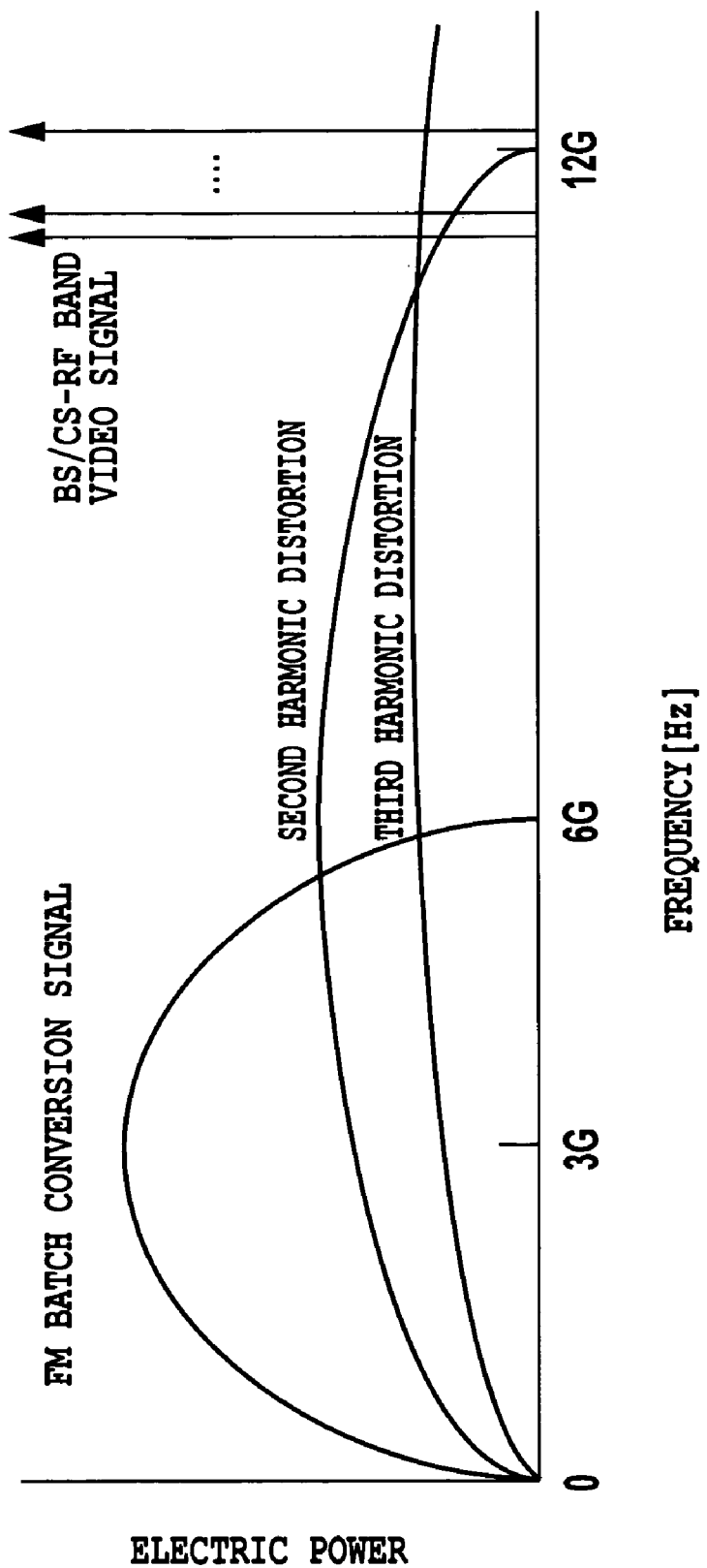
FIG. 12 is a graph representing a spectrum at point "J" of FIG. 2.
Figure 13:
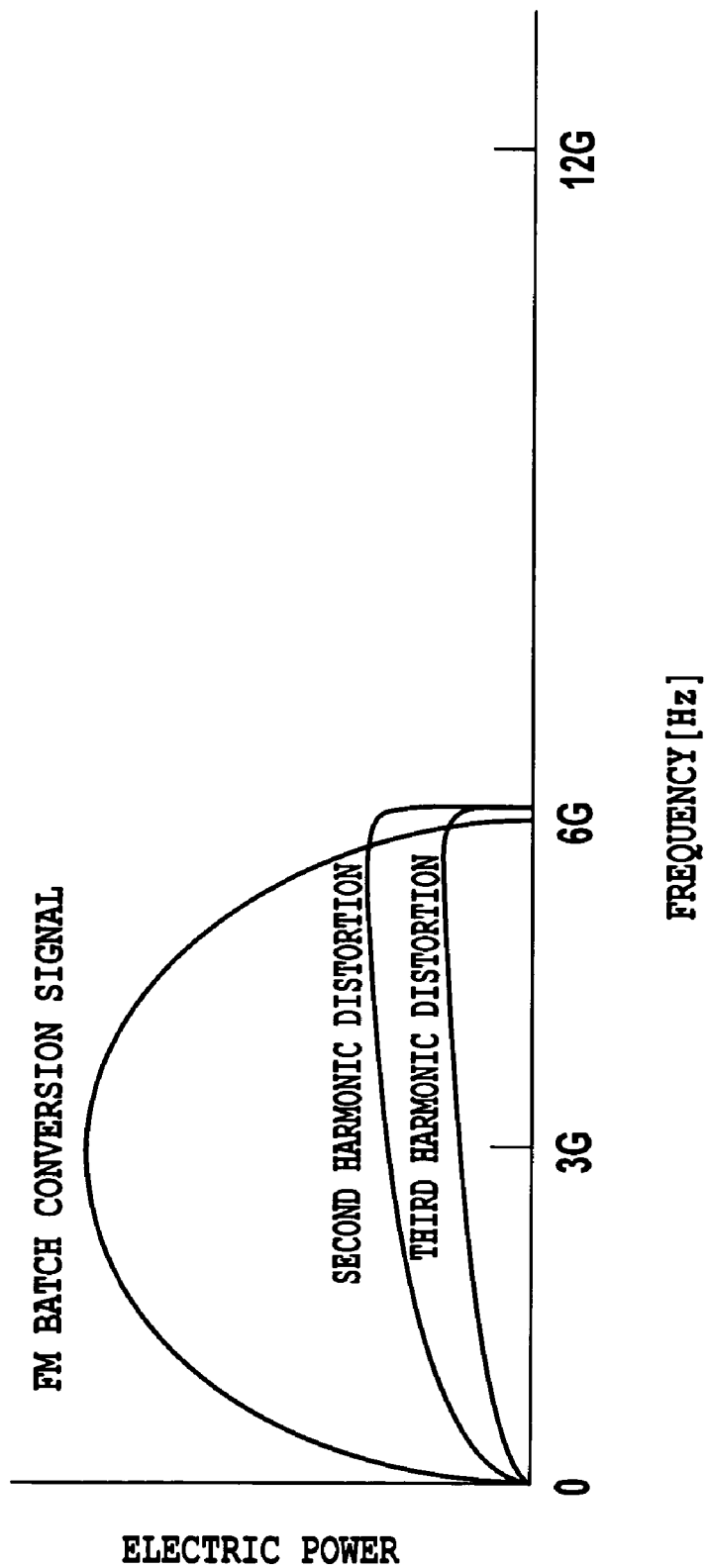
FIG. 13 is a graph representing a spectrum at point "K" of FIG. 2.

As such, even if converted to the frequency band (1.0 to 2.1 GHz) of the BS/CS-IF signals by the block down-converter (LNB) 74, the second and third harmonic distortions remain within the band at point "I" as shown in FIG. 11, leading to interference against video signals of the BS/CS satellite broadcasting.

Next, the integral type optical receiving device of FIG. 2 will be described. As shown in FIG. 4, second and third harmonic distortions due to the FM batch converter 12 are generated at point "B" of FIG. 1. These distortions are further increased by the optical transmitter 14 at point "E" of FIG. 1, as shown in FIG. 7.

Figure 14:
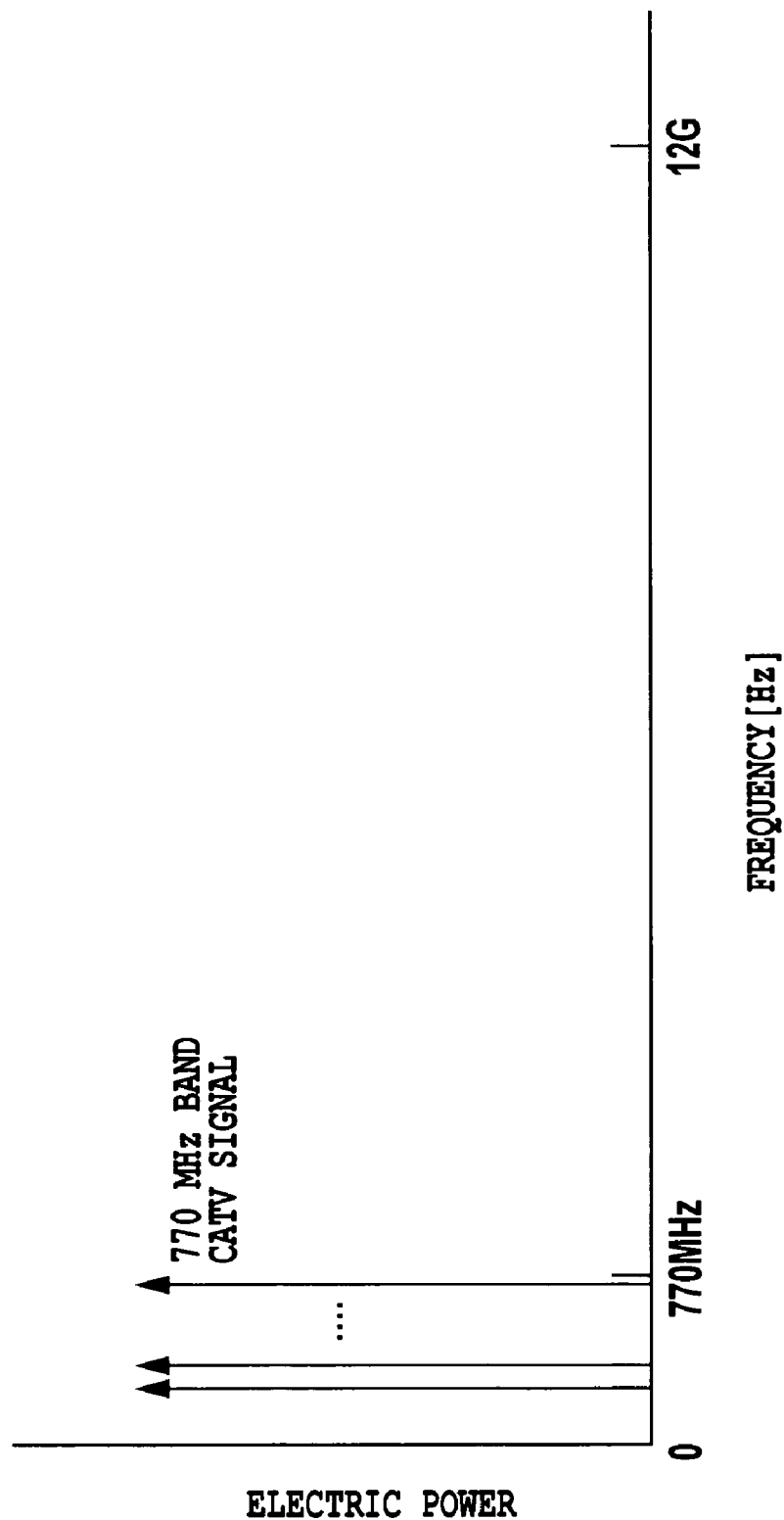
FIG. 14 is a graph representing a spectrum at point "L" of FIG. 2.
Figure 15:
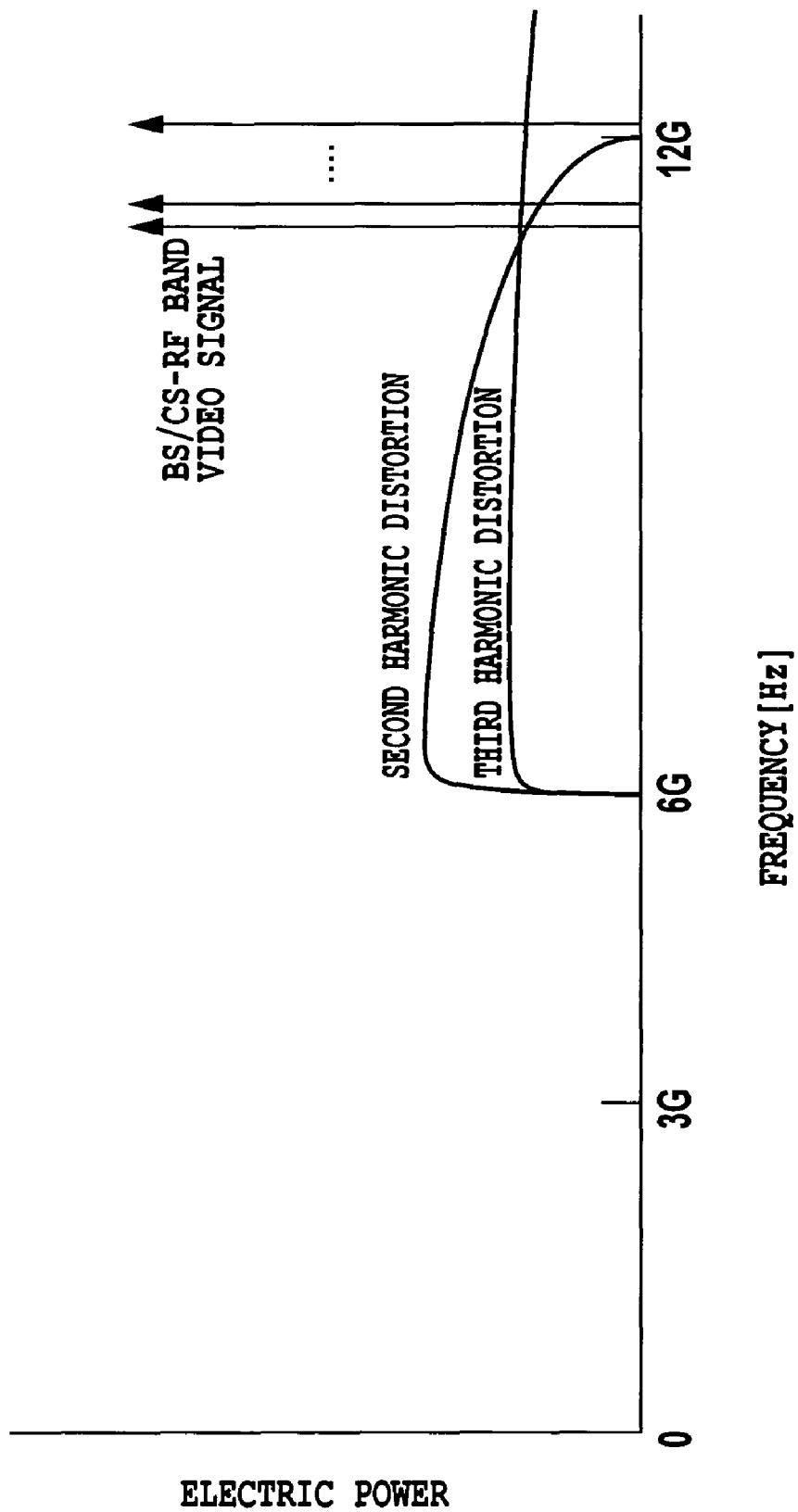
FIG. 15 is a graph representing a spectrum at point "M" of FIG. 2.
Figure 16:
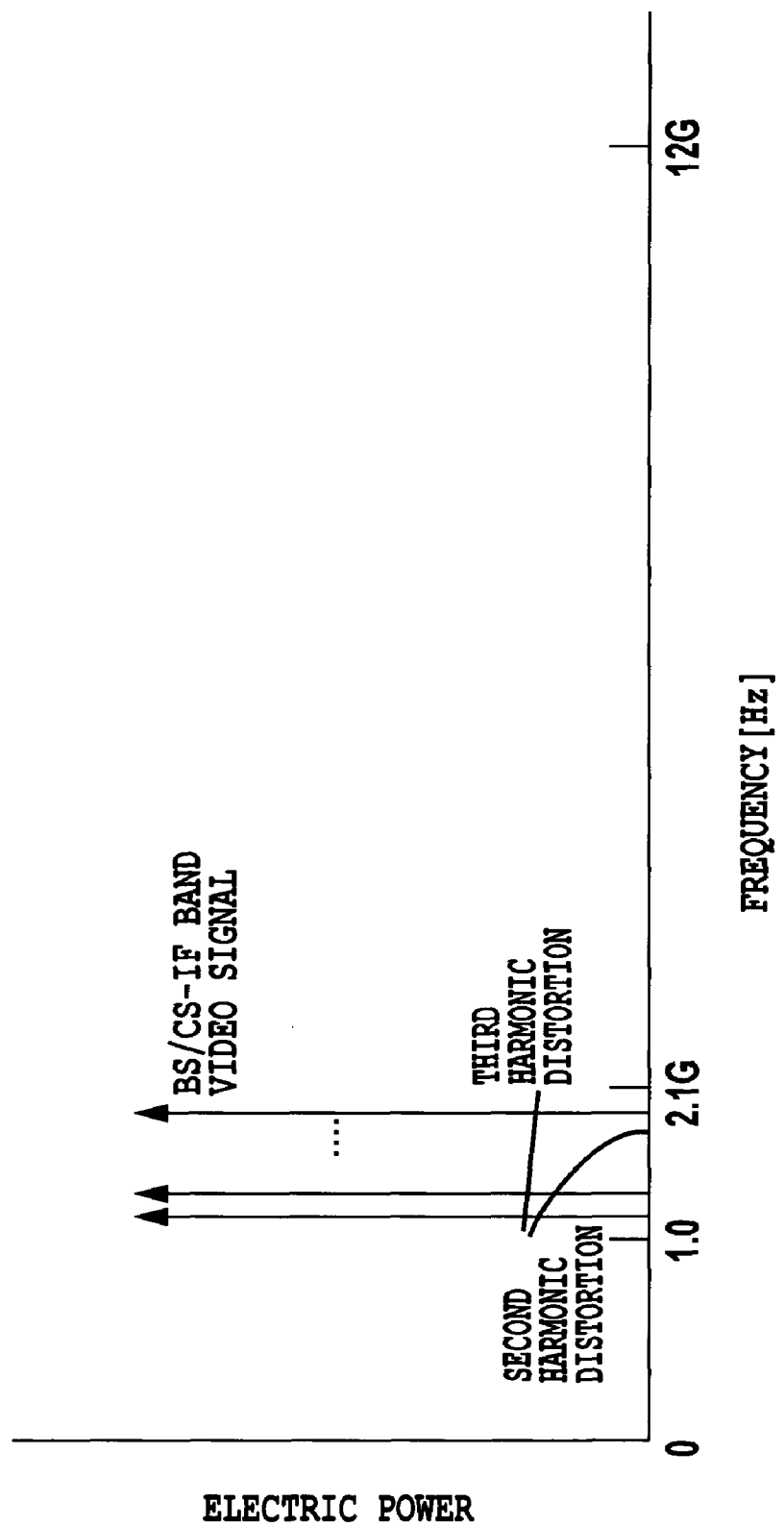
FIG. 16 is a graph representing a spectrum at point "N" of FIG. 2.

The FM batch conversion signal is demodulated by the FM demodulator 64 of FIG. 2 and, as shown in FIG. 14, the CATV signals can be restored without degradation at point "L" of FIG. 2 (refer to Non-Patent Document 2). As shown in FIG. 15, however, the second and third harmonic distortions of the FM batch conversion signal fall within the band (11.7 to 12.8 GHz) of the BS/CS-RF signal at point "M" of FIG. 2. As such, even if converted to the frequency band (1.0 to 2.1 GHz) of the BS/CS-IF signals by the block down-converter (LNB) 74 of FIG. 2, as shown in FIG. 16, the second and third harmonic distortions remain within the band at point "N" of FIG. 2, leading to interference against video signals of the BS/CS satellite broadcasting.

Figure 17:
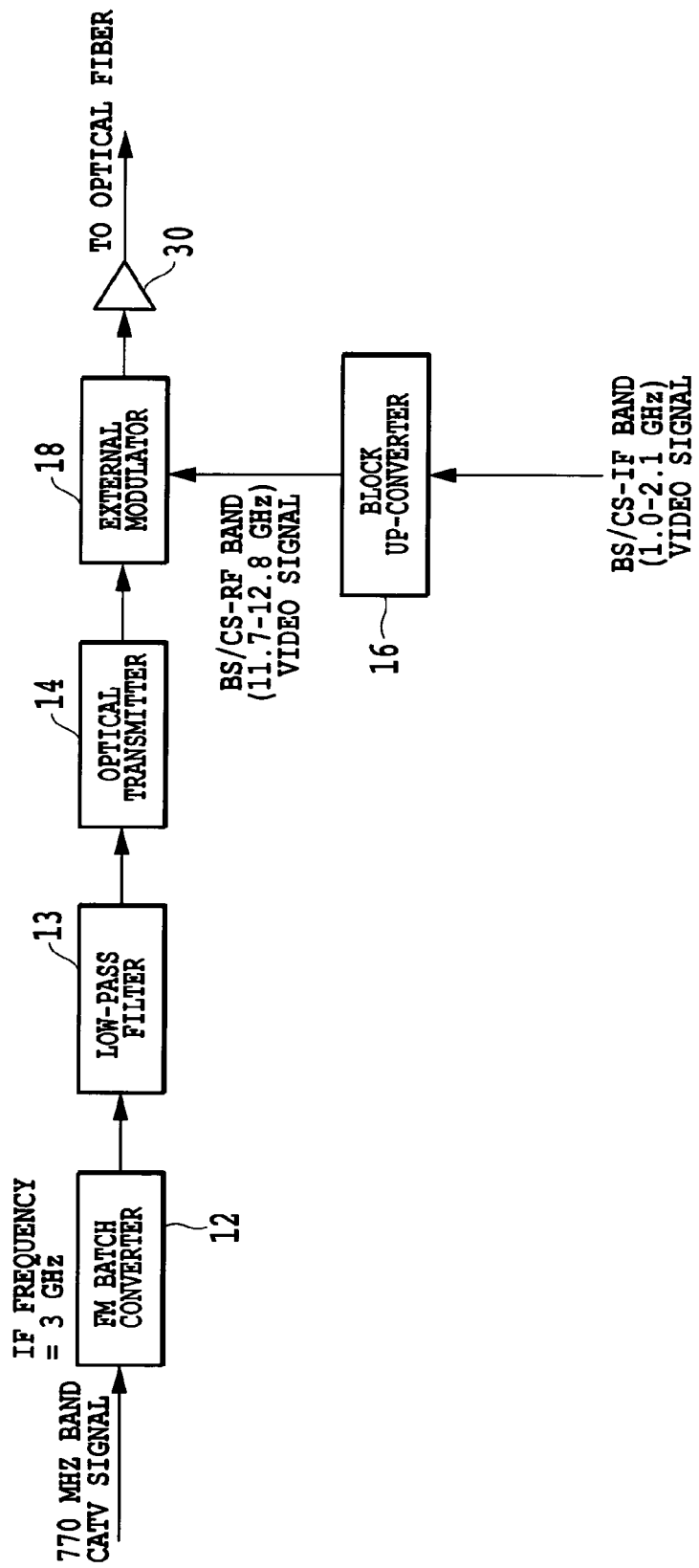
FIG. 17 is a block diagram showing an exemplary configuration of another optical transmitting device in the optical transmission system which performs frequency-multiplexing of a first and a second signals for transmission.

Also, as shown in FIG. 17, a low-pass filter may be placed after the FM batch converter 12 to reduce high frequency distortions, which suppresses a signal of 6 GHz or higher. In that case, however, a higher modulation index (approximately 80%) have to be used in the following optical transmitter 14 to extend the transmission distance, and hence, the generation of harmonic distortions can not be prevented.

First Embodiment

Figure 18:
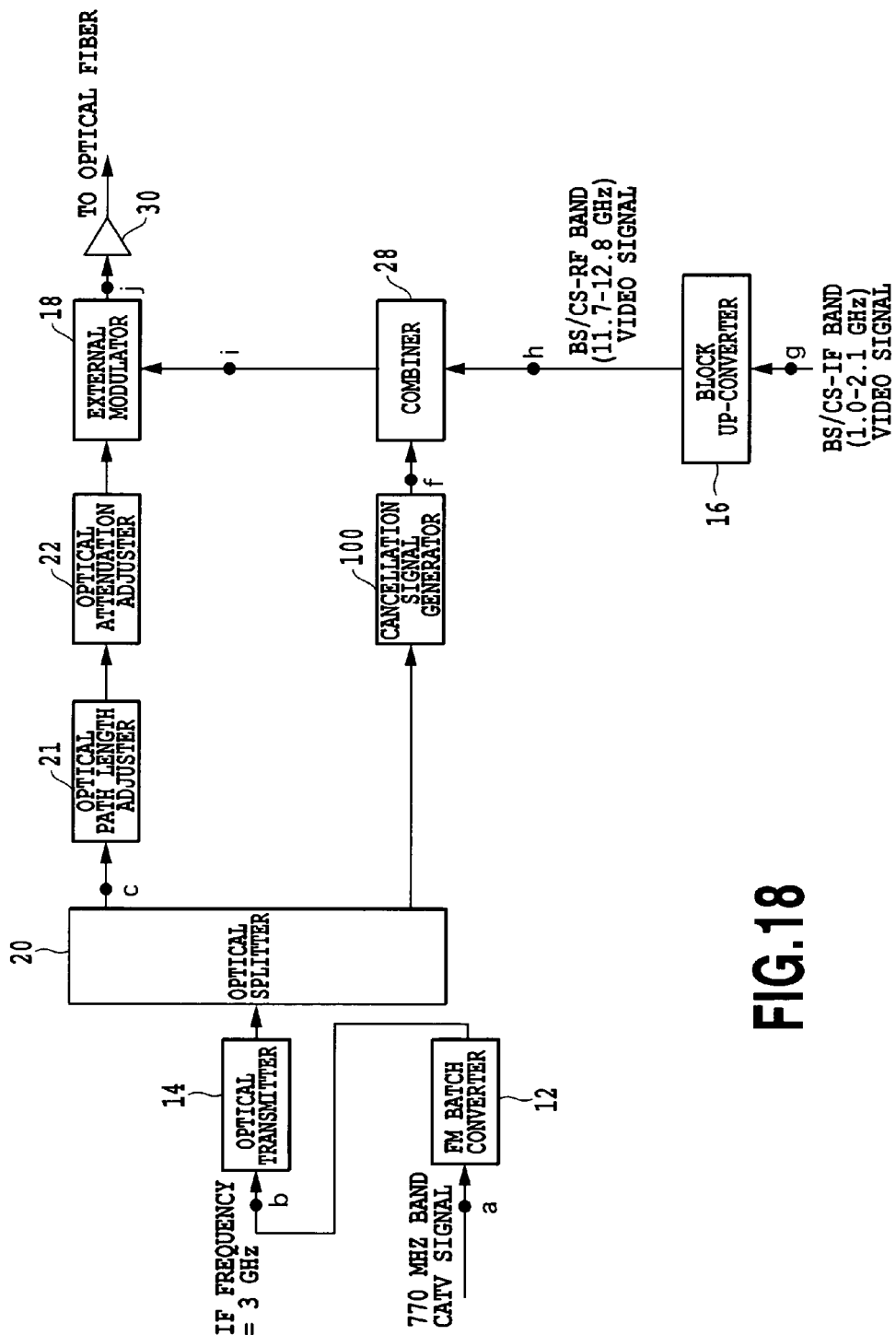
FIG. 18 is a block diagram showing an exemplary configuration according to a first embodiment of the optical transmitting device in the optical transmission system according to the present invention which performs frequency-multiplexing of a first and a second signals for transmission.
Figure 20:
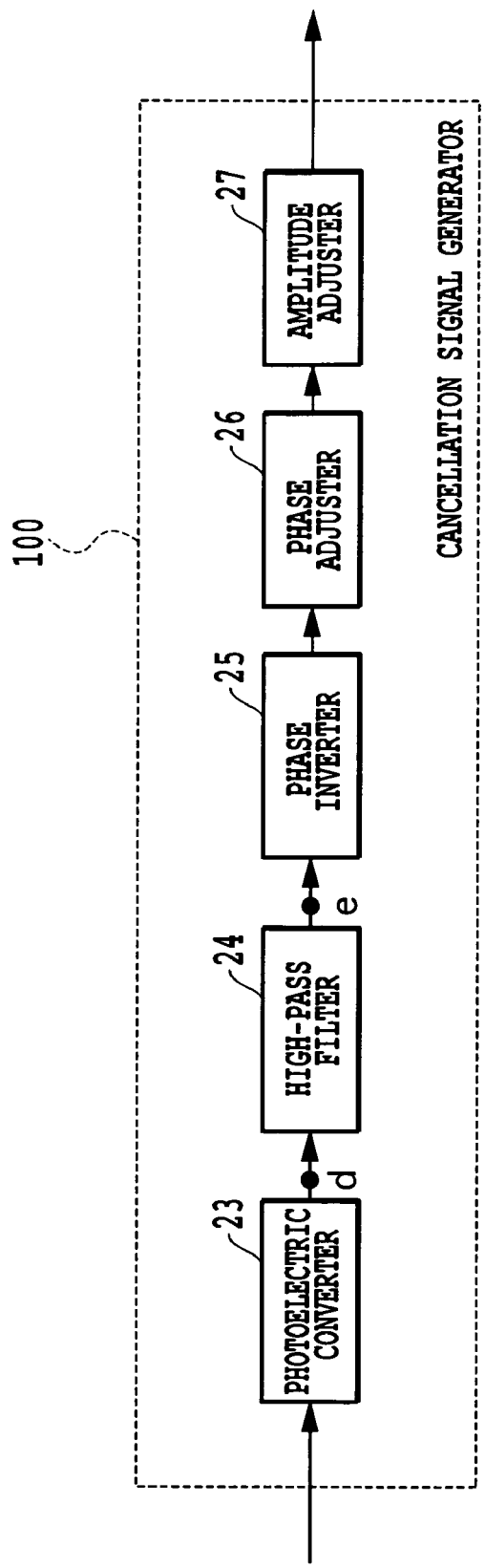
FIG. 20 is a block diagram showing an exemplary configuration of a cancellation signal generator according to the present invention.

FIG. 18 shows an exemplary configuration of the optical transmitting device according to a first embodiment of the present invention. Further, FIG. 20 shows the exemplary configuration of a cancellation signal generator of FIG. 18. In the optical transmitting device, CATV signals with a frequency of 90 to 77 MHz are frequency-modulated by the FM batch converter 12 and converted to an FM batch conversion signal with a center frequency of 3 GHz and a frequency bandwidth of 6 GHz.

Then, the optical transmitter 14 intensity-modulates an optical signal with the FM batch conversion signal for output. The intensity-modulated optical signal with the FM batch conversion signal is split into two branches by an optical splitter 20. One of the split optical signals is processed in the cancellation signal generator 100 as follows. Referring to FIG. 20, the optical signal is converted to an electrical signal by a photoelectric converter 23 passing the signal of 6 GHz or higher through by a high-pass filter 24 to extract harmonic distortions having higher frequencies than the FM batch conversion signal. The extracted harmonic distortions are phase-inverted by a phase inverter 25, phase-adjusted by a phase adjuster 26 and amplitude-adjusted by an amplitude adjuster 27 for output as a cancellation signal. Then, the cancellation signal is combined with the BS/CS-RF signals by a combiner 28 of FIG. 18.

The combined electrical signal is input to the external modulator 18 to externally modulate the other optical signal split by the optical splitter 20. The other optical signal is adjusted in terms of the optical path length by an optical path length adjuster 21 and adjusted in terms of the attenuation by an optical attenuation adjuster 22 for input to the external modulator 18. The optical signal is to be externally modulated in the external modulator 18 by the electrical signal combining with the cancellation signal from the combiner 28. Note that various adjustments by the optical path length adjuster 21, the optical attenuation adjuster 22, the phase adjuster 26 and the amplitude adjuster 27 are made such that harmonic distortions present in the optical signal are minimized. In other words, through the adjustments, the harmonic components in the optical signal are cancelled out and a high-quality optical signal is provided from the external modulator 18.

Figure 21:
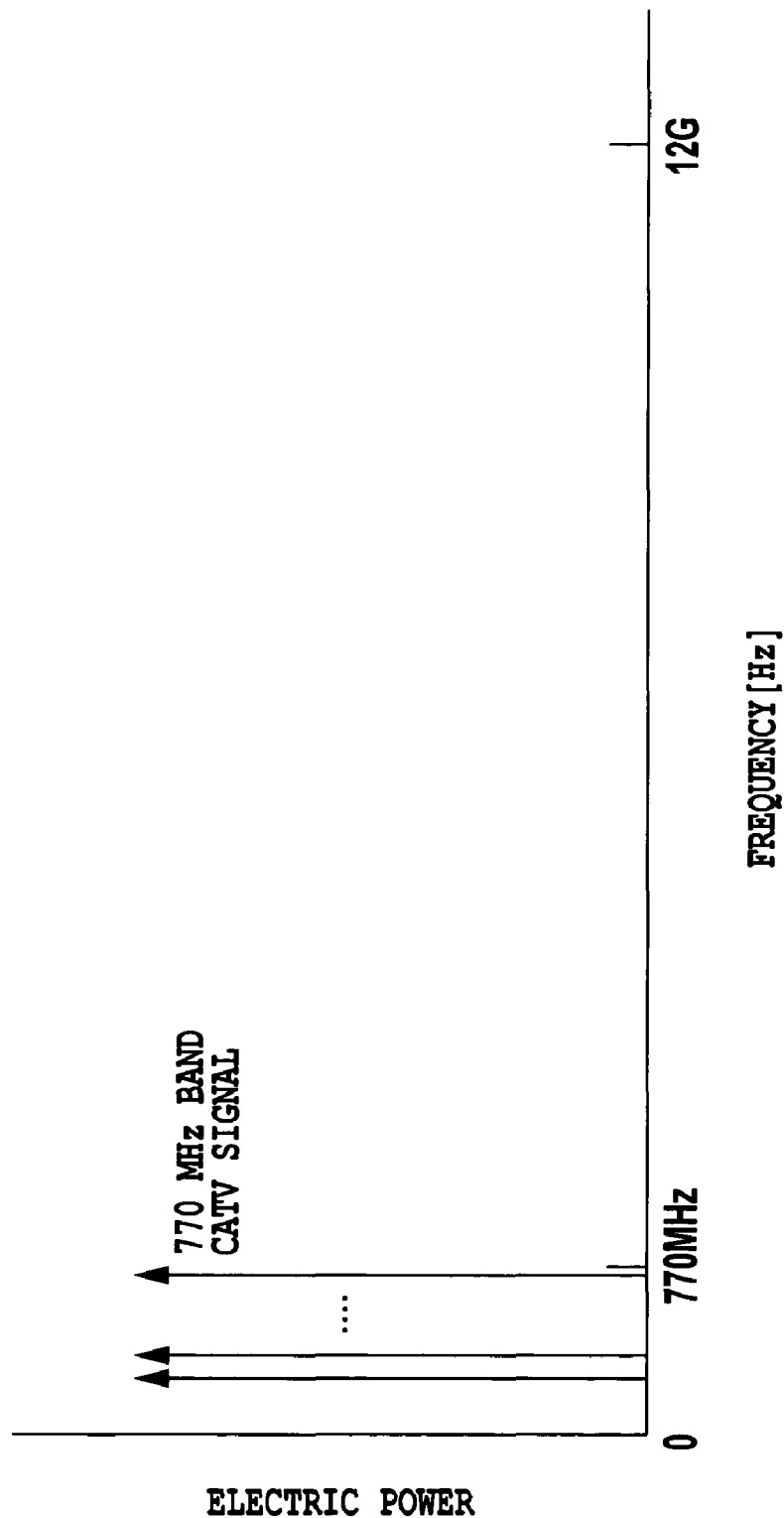
FIG. 21 is a graph representing a spectrum at point "a" of FIG. 18 and FIG. 19.
Figure 22:
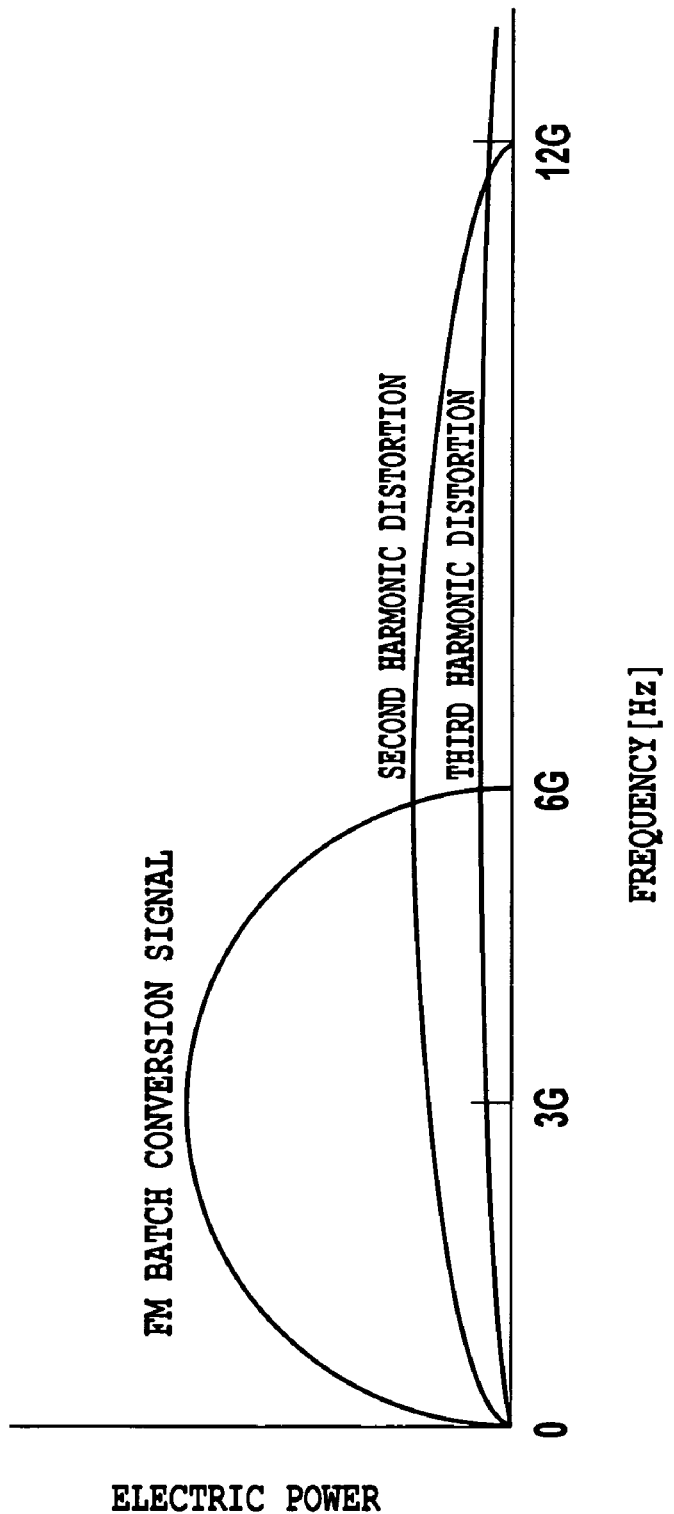
FIG. 22 is a graph representing a spectrum at point "b" of FIG. 18 and FIG. 19.
Figure 23:
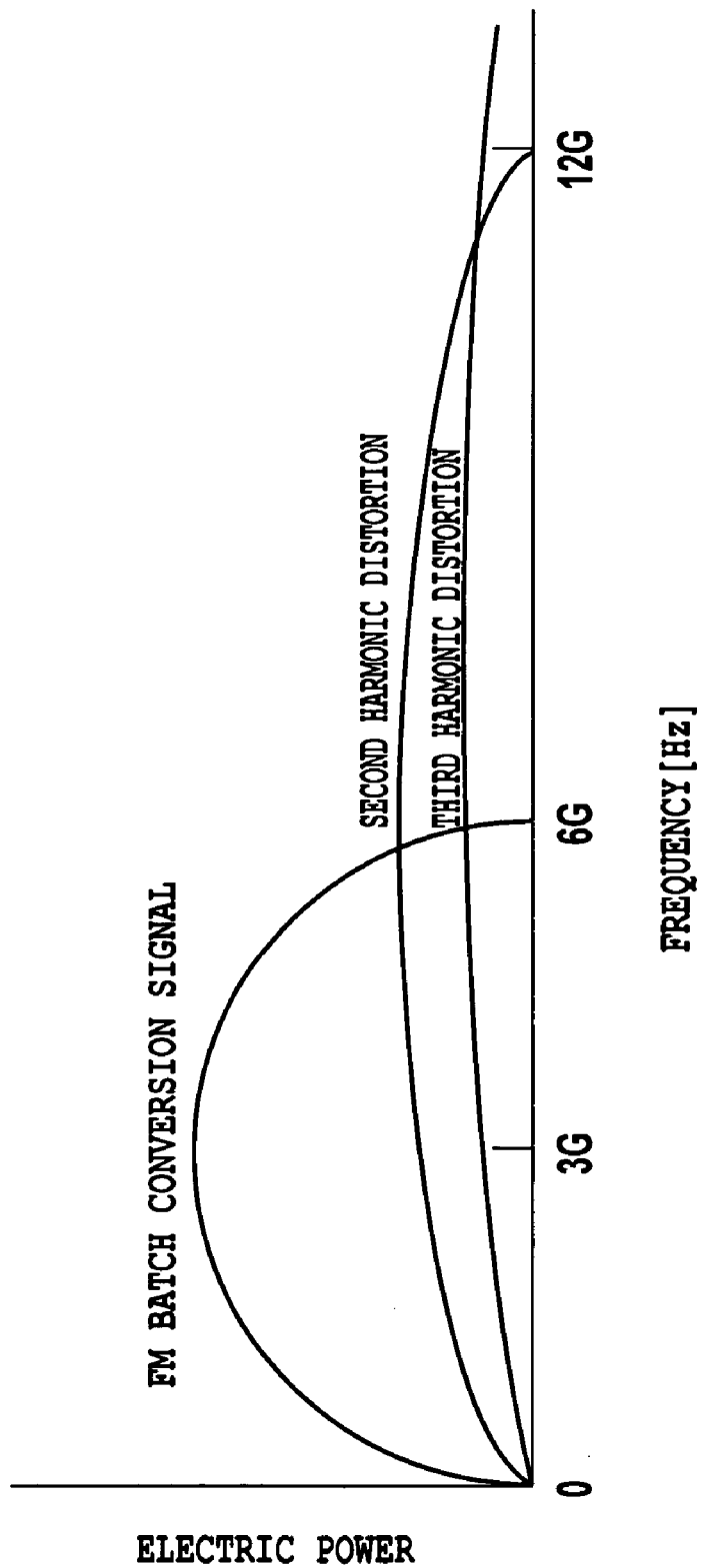
FIG. 23 is a graph representing a spectrum at point "c" of FIG. 18 and FIG. 19.
Figure 30:
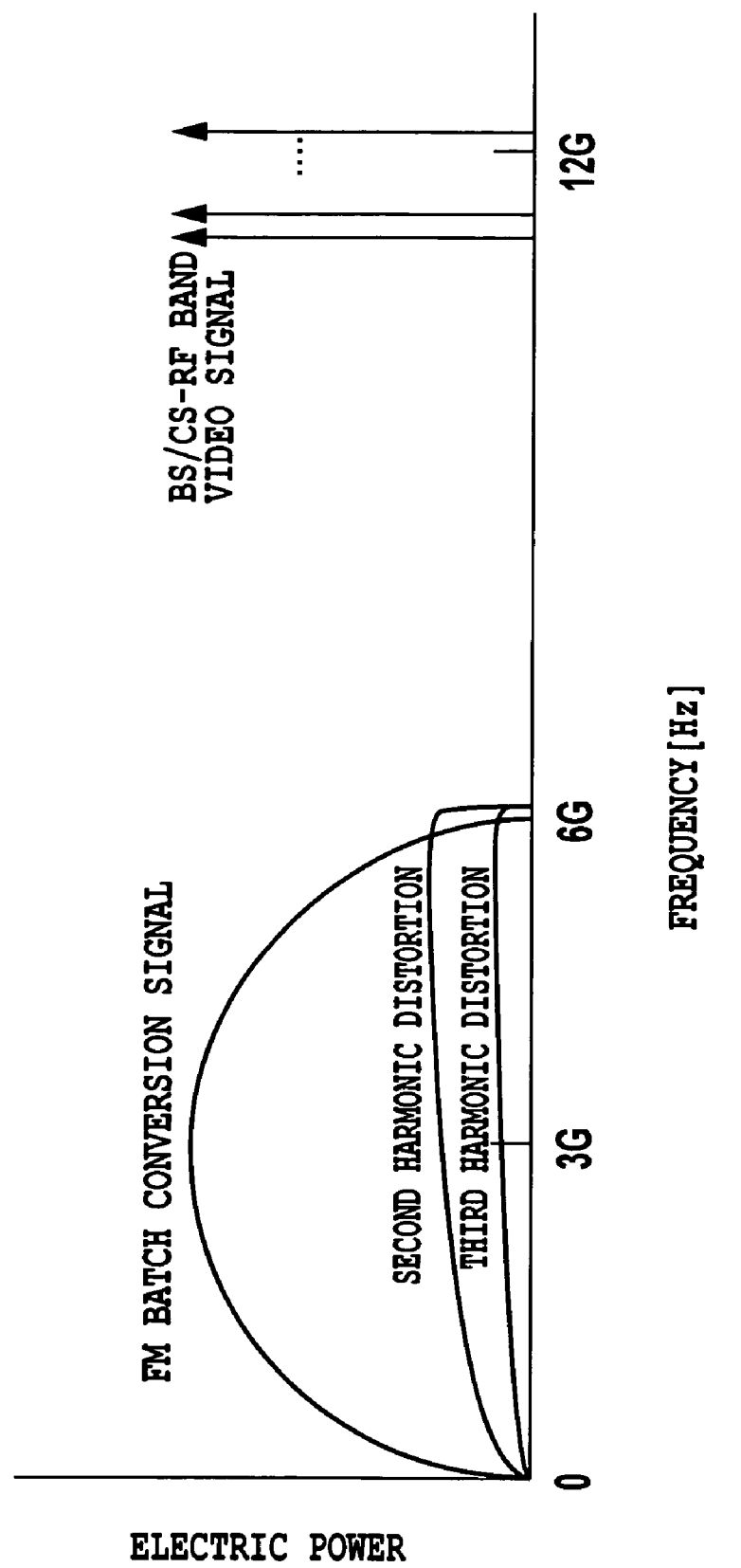
FIG. 30 is a graph representing a spectrum at point "j" of FIG. 18 and FIG. 19.

Next, FIG. 21 to 30 shows spectra at points "a" to "j" in the exemplary configurations of FIG. 18 and FIG. 20. Note that since the signals at points "c" and "j" are optical signals, the electrical frequency spectra after photo-electrically converted the optical signals are shown in FIG. 23 and FIG. 30, respectively.

Figure 3:
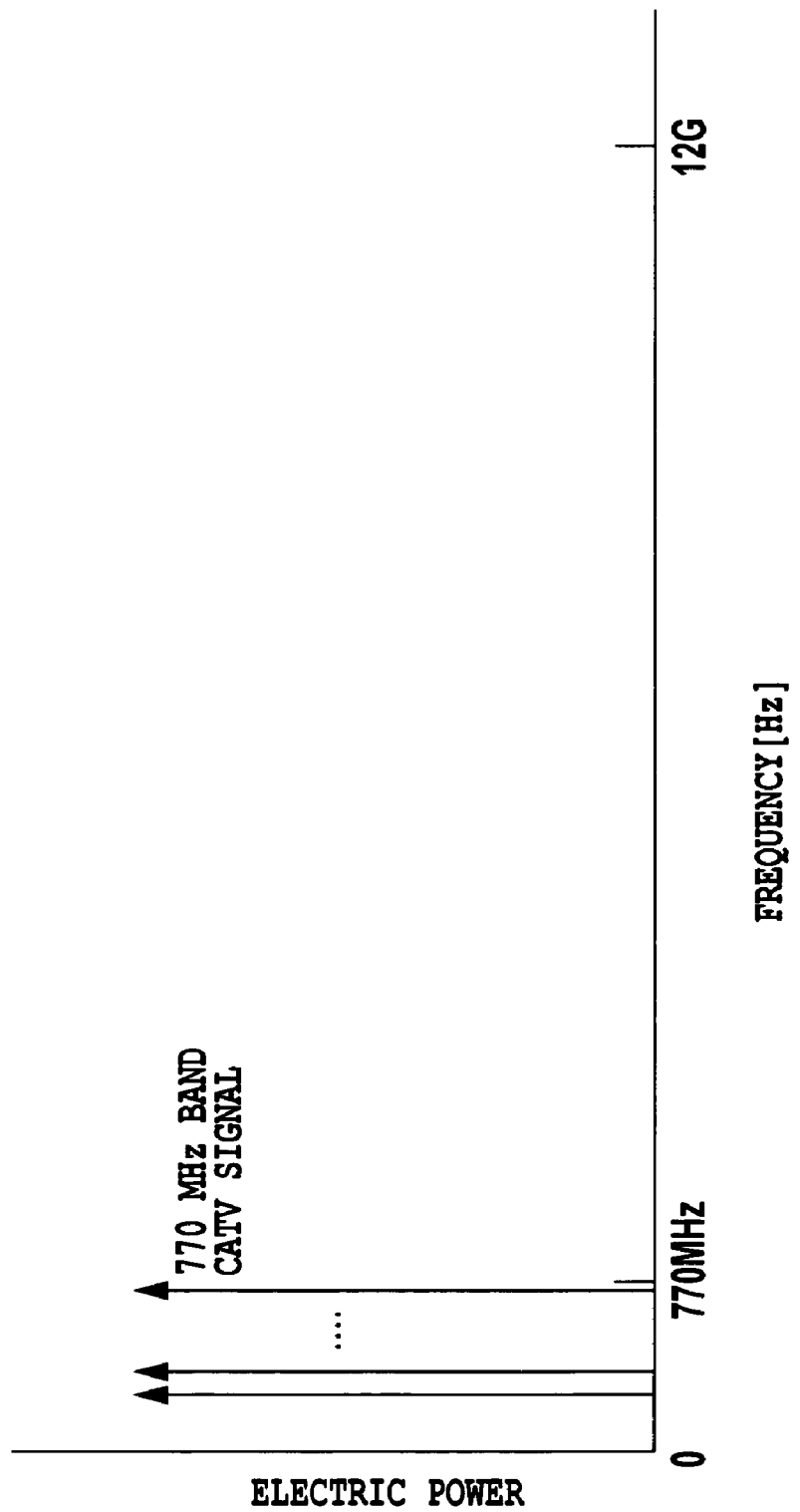
FIG. 3 is a graph representing a spectrum at point "A" of FIG. 1.
Figure 24:
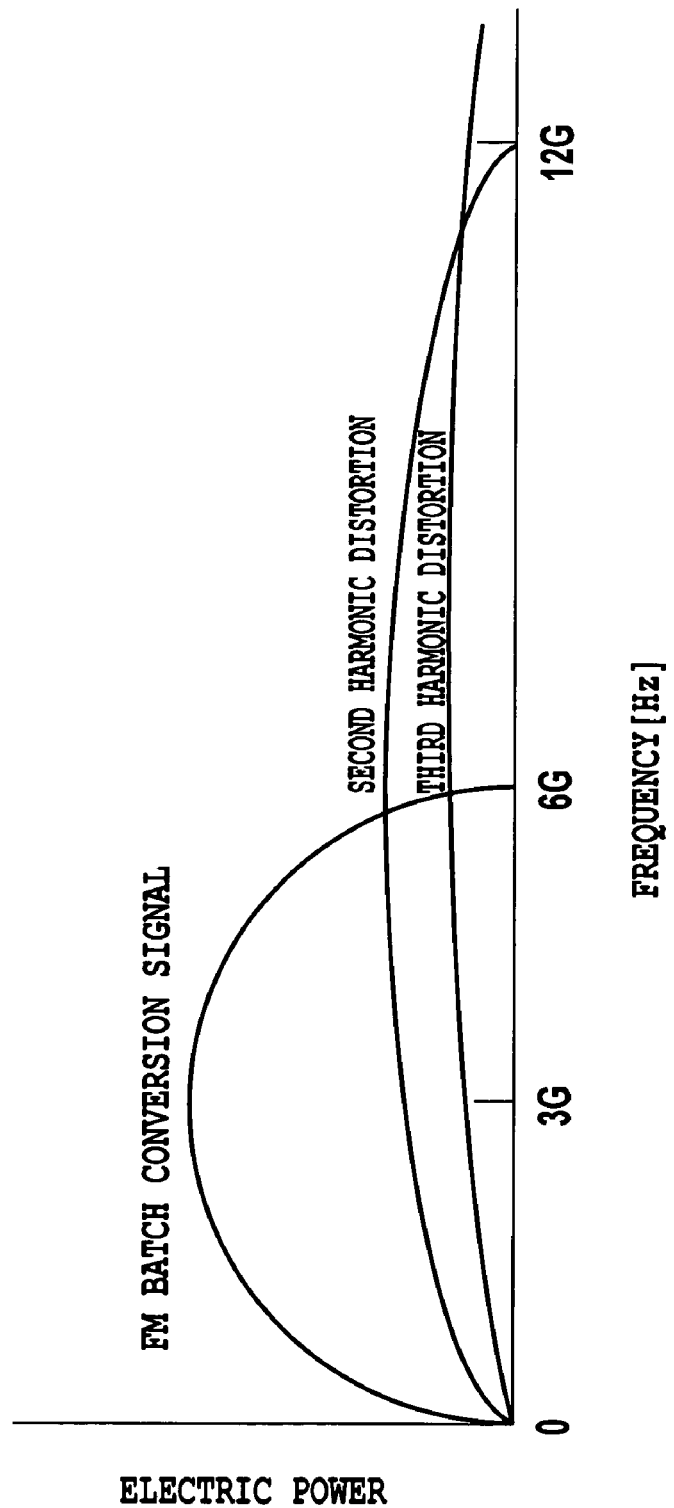
FIG. 24 is a graph representing a spectrum at point "d" of FIG. 20.

FIG. 21 (point "a") and FIG. 22 (point "b") are similar spectra to those of FIG. 3 (point "A") and FIG. 4 (point "B"). FIG. 23 (point "c") shows a spectrum after the optical splitter 20, which is substantially similar to the spectrum of FIG. 22 (point "b"). FIG. 24 (point "d") shows a spectrum after the photoelectric converter 23, which is also substantially similar to the spectrum of FIG. 22 (point "b").

Figure 25:
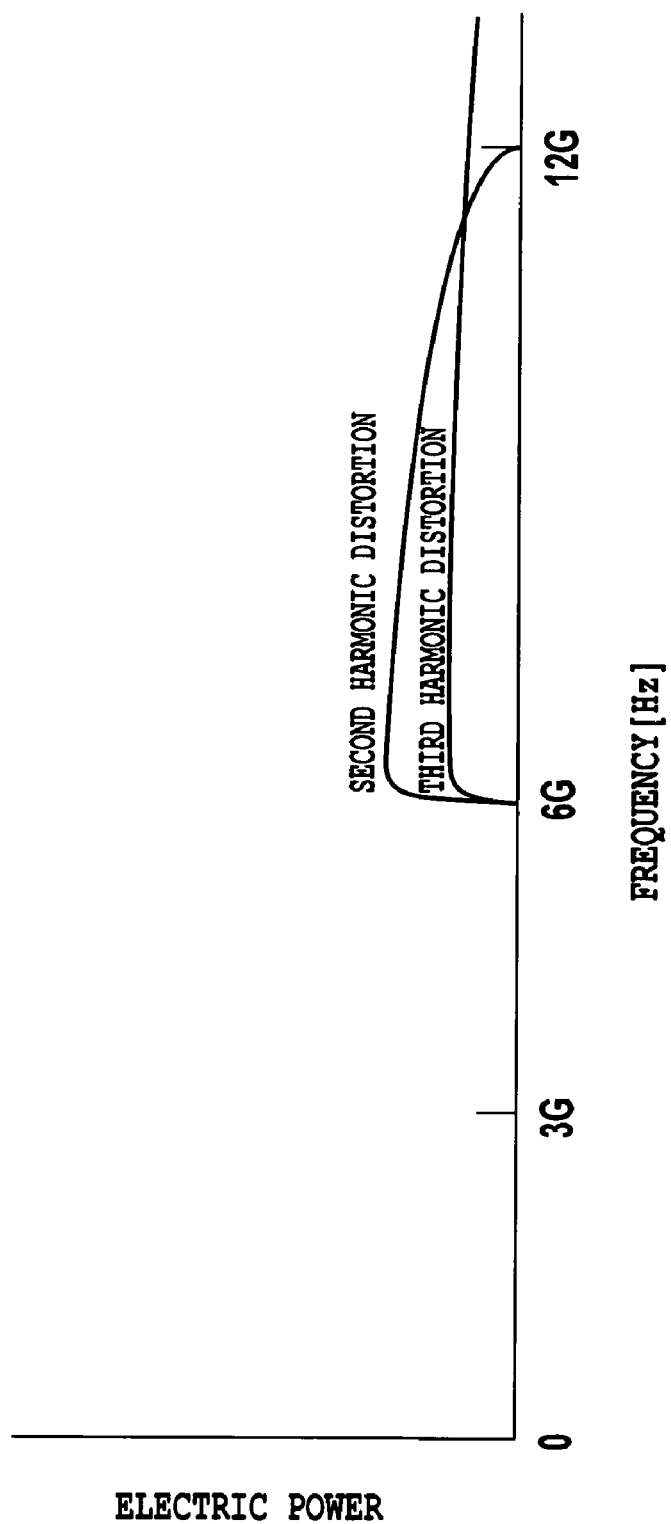
FIG. 25 is a graph representing a spectrum at point "e" of FIG. 20.
Figure 26:
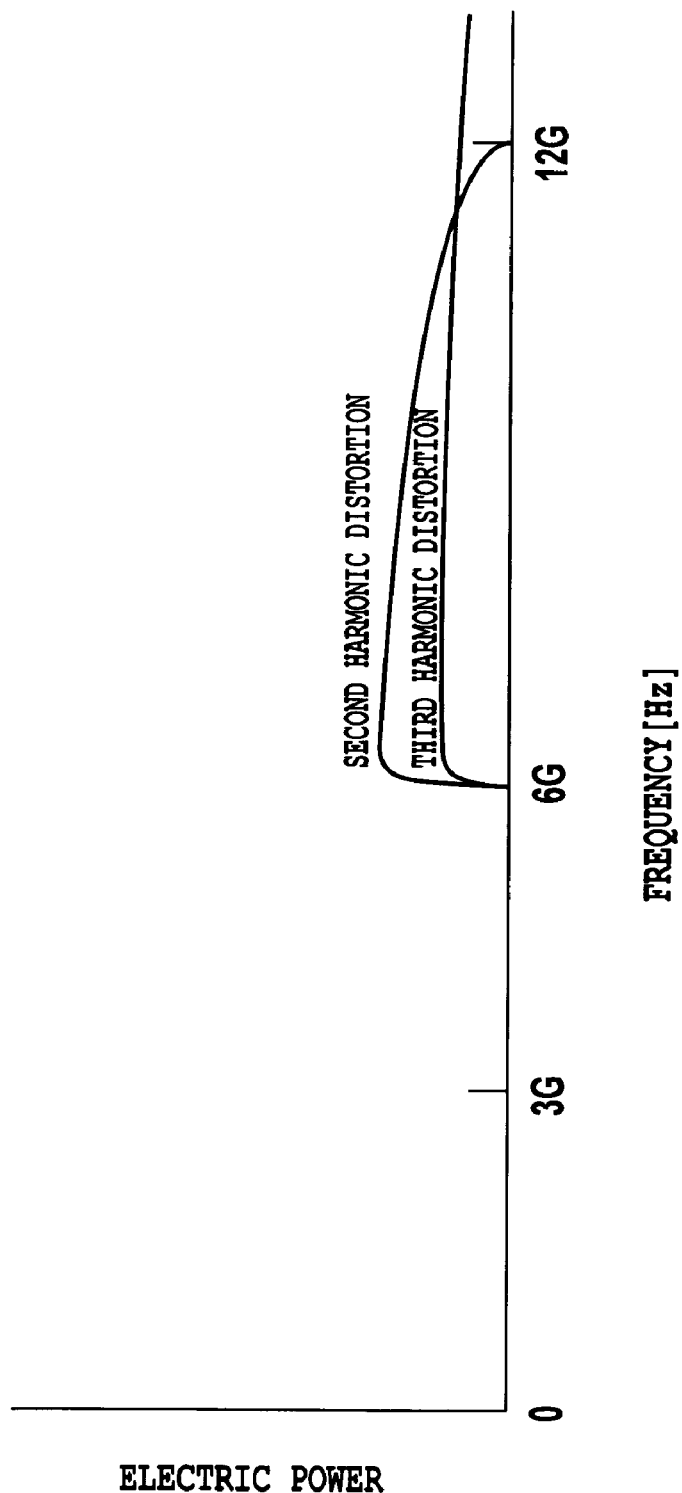
FIG. 26 is a graph representing a spectrum at point "f" of FIG. 18 and FIG. 19.

FIG. 25 (point "e") shows a spectrum with only high frequency components of 6 GHz or higher being extracted by the high-pass filter 24. The signal is phase-inverted, phase-adjusted and amplitude-adjusted, which turns out to a spectrum at point "E" as shown in FIG. 26. This cancellation signal is combined, by the combiner 28, with BS/CS-RF signals of FIG. 28 (point "h") which are up-converted from BS/CS-IF signals of FIG. 27 (point "g") by a block converter 16 for output as a signal shown in FIG. 29 (point "i"). With this output signal, the optical signal of FIG. 23 (point "c") is intensity-modulated at the external modulator 18 after passing through the optical path length adjuster 21 and the optical attenuation adjuster 22. At this point, since the second and third harmonic distortions of FIG. 29 (point "i") are phase-inverted with respect to the second and third harmonic distortions of FIG. 23 (the point "c"), these harmonic distortions are to be cancelled out each other, when intensity-modulated by the external modulator 18.

By adjusting phase, time and amplitude of the distortions up to the external modulator 18 on the phase-inverted signal, the cancellation amount of the distortions in the external modulator 18 can be determined. According to the first embodiment of the present invention, the second and third harmonic distortions of the FM batch conversion signal can virtually be zeroed in the frequency band of the BS/CS-RF signals at point "j", as shown in FIG. 30.

The signal shown in FIG. 30 is then amplified by the amplifier 30 and transmitted via the optical fiber 40, which can then be received by the branch type optical receiving device shown in FIG. 1 or the integral type optical receiving device shown in FIG. 2. The received BS/CS-RF signals have no interference by the second and third harmonic distortions of the FM batch conversion signal, and thus reproducing high-quality video signals.

Second Embodiment

Figure 19:
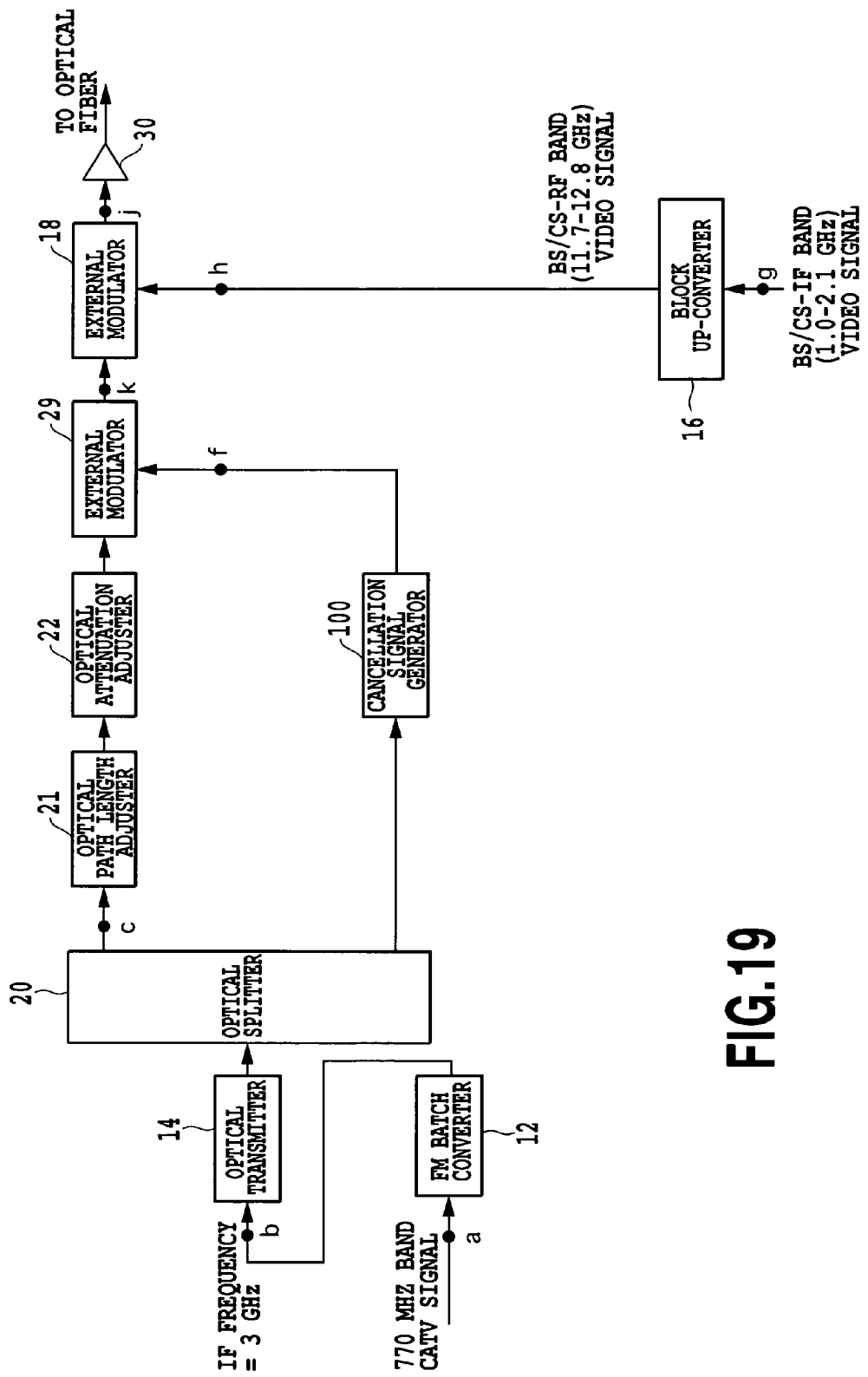
FIG. 19 is a block diagram showing an exemplary configuration according to a second embodiment of the optical transmitting device in the optical transmission system according to the present invention which performs frequency-multiplexing of a first and a second signals for transmission.

FIG. 19 shows an exemplary configuration of the optical transmitting device according to a second embodiment of the present invention. Also, FIG. 20 shows an exemplary configuration of the cancellation signal generator of FIG. 19. In this embodiment, compared to the first embodiment of FIG. 18, the output of the cancellation signal generator 100 is connected to another external modulator 29 placed before the external modulator 18, as opposed to the combiner 28. As such, since the processes up to the cancellation signal generator 100 and the optical attenuation adjuster 22 are substantially similar to the case in the first embodiment, the descriptions are omitted.

The electrical signal (the cancellation signal) output from the cancellation signal generator 100 is input to the external modulator 29 which externally modulates the optical signal from the optical attenuation adjuster 22. At this point, various adjustments by the optical path length adjuster 21, the optical attenuation adjuster 22, the phase adjuster 26 and the amplitude adjuster 27 are made to minimize the harmonic distortions present in the optical signal. That is, the optical signal having the harmonic distortions cancelled out in the high frequency area of the optical signal is provided through the adjustments.

The optical signal having the harmonic distortions cancelled out is externally modulated with the BS/CS-RF signal in the external modulator 18 and amplified by the amplifier 30 for output to the optical fiber 40.

Now, the spectra at points "a" to "h", "j" and "q" in the exemplary configuration of FIG. 19 are shown in FIGS. 21 to 28, 30 and 31, respectively. Note that since the signals at points "c", "j" and "k" are optical signals, the electrical frequency spectra after photo-electrically converted the optical signals are shown in FIG. 23, FIG. 30 and FIG. 31, respectively.

The spectrum of FIG. 25 (point "e") shows a spectrum with only high frequency components of 6 GHz or higher being extracted by the high-pass filter 24. The signal is phase-inverted, phase-adjusted and amplitude-adjusted, which turns out to a spectrum at point "f" as shown in FIG. 26. With this cancellation signal, the optical signal of FIG. 23 (the point c) is intensity-modulated in the external modulator 29 after passing through the optical path length adjuster 21 and the optical attenuation adjuster 22. At this point, since the second and third harmonic distortions of FIG. 26 (point "f") are phase-inverted with respect to the second and third harmonic distortions of FIG. 23 (point "c"), these harmonic distortions are to be cancelled out each other, when intensity-modulated by the external modulator 29.

By adjusting phase, time and amplitude of the distortions up to the external modulator 29 on the phase-inverted signal, a cancellation amount of the distortions in the external modulator 29 can be determined. Hereby, it is understood that the harmonic distortions of the FM batch conversion signal are cancelled out in a high frequency area of the optical signal of the CATV signals at point "k", as shown in FIG. 31.

Figure 27:
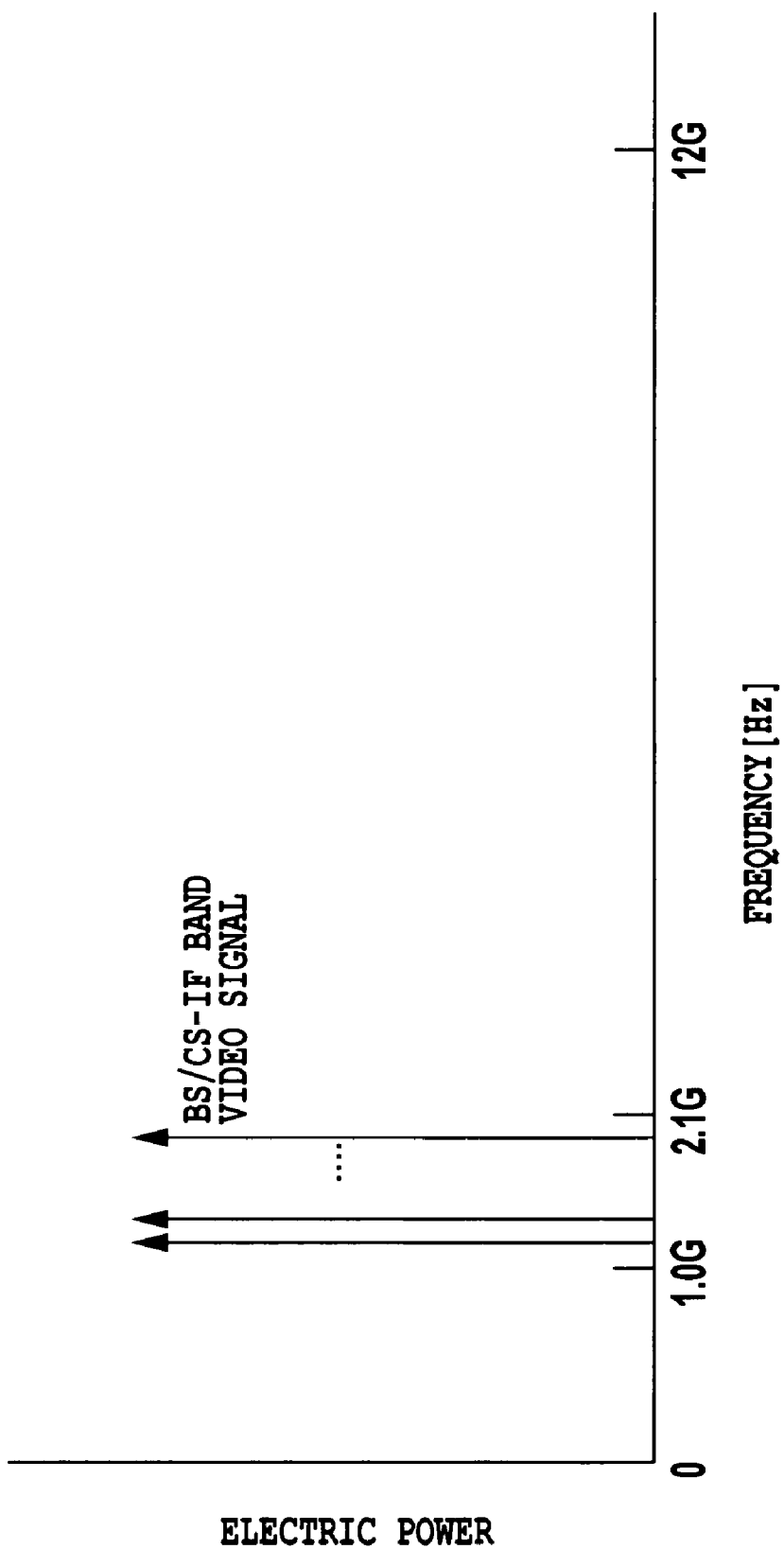
FIG. 27 is a graph representing a spectrum at point "g" of FIG. 18 and FIG. 19.
Figure 28:
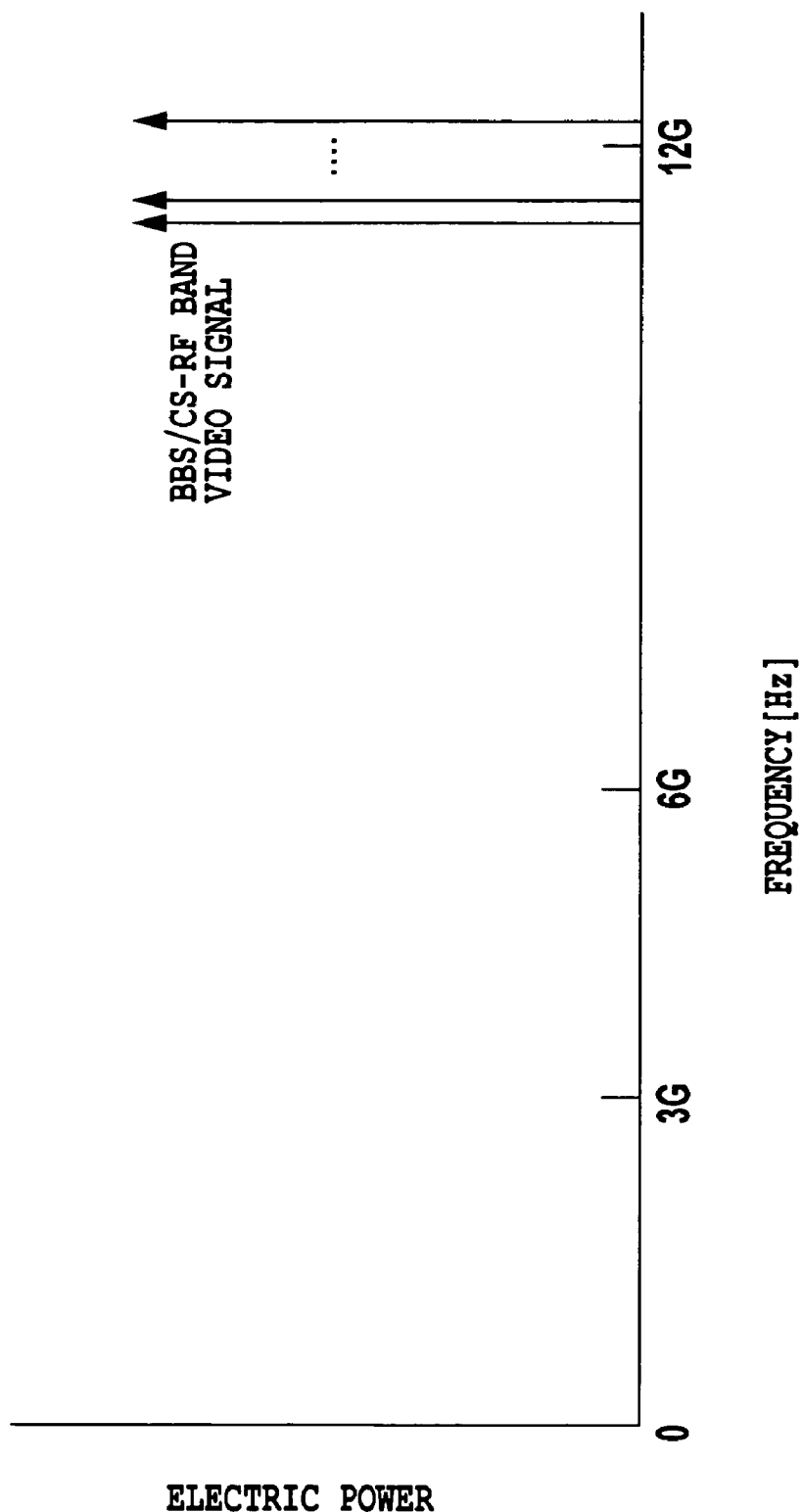
FIG. 28 is a graph representing a spectrum at point. "h" of FIG. 18 and FIG. 19.
Figure 29:
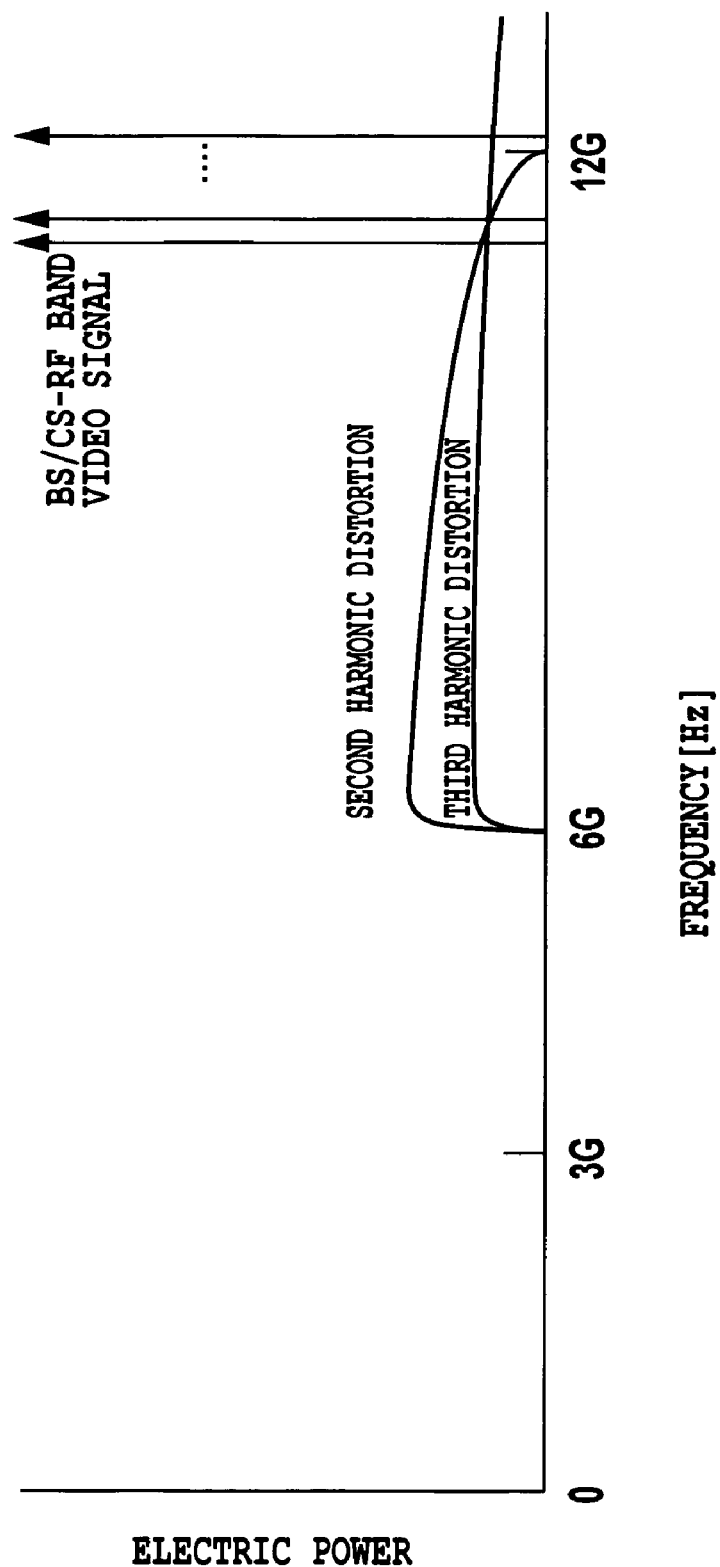
FIG. 29 is a graph representing a spectrum at point "i" of FIG. 18.

The optical signal having the high frequency distortions cancelled out is externally modulated at the external modulator 18 with the BS/CS-RF signals of FIG. 28 (point "h") which are up-converted from the BS/CS-IF signals shown in FIG. 27 (point "g") by a block up-converter 16, and is output as the signals shown in FIG. 30 (point "j"). According to the second embodiment of the present invention, the second and third harmonic distortions of the FM batch conversion signal can virtually be zeroed in the frequency band of the BS/CS-RF signals at point "j", as shown in FIG. 30.

The signal shown in FIG. 30 is amplified by the amplifier 30, which can be received via the optical fiber 40 by the branch type optical receiving device shown in FIG. 1 or the integral type optical receiving device shown in FIG. 2. The received BS/CS-RF signals have no interference of the second and third harmonic distortions by the FM batch conversion signal, which enable a reproduction of higher-quality video signals.

Other Embodiment

The present invention has been specifically described based on the above embodiments. Considering various feasible embodiments to which the principles of the present invention may be applied, the embodiments described herein are for illustration purpose only and are not intended to limit the scope of the present invention. The embodiments illustrated herein can be modified in its configuration and details without departing from the spirit of the invention. Moreover, the components illustrated may be modified, supplemented and/or changed in their order without departing from the spirit of the invention.

For instance, in the configuration of the cancellation signal generator shown in FIG. 20, the order of the high-pass filter 24, the phase inverter 25, the phase adjuster 26 and the amplitude adjuster 27 may be changed. Similarly, the order of the optical path length adjuster 21 and the optical attenuation adjuster 22 in FIG. 18 and FIG. 19 may be changed.

Further, instead of adjusting the phase by the phase adjuster 26 of the cancellation signal generator 100, the optical path length of the optical path from the optical splitter 20 to the external modulator 18 of FIG. 18 may be adjusted. Similarly, instead of adjusting the phase by the phase adjuster 26 of the cancellation signal generator 100, the optical path length of the optical path from the optical splitter 20 to the external modulator 29 of FIG. 19 may be adjusted. The optical path length can be adjusted using the optical path length adjuster or the optical fiber cords with different lengths.

Furthermore, by inverting the polarity of an external modulation port of the external modulator 18 shown in FIG. 18 or the external modulator 29 shown in FIG. 19, the phase inverter 25 may be eliminated.

Still further, instead of using the amplitude adjuster 27, the optical attenuation adjuster may be placed in front of the photoelectric converter 23 to adjust the optical power.

Still further, instead of using the high-pass filter 24 shown in FIG. 18 and FIG. 19, a band-pass filter for passing an occupied band of the second signal may be used. In the configuration using such band-pass filter, it is applicable even when the second signal has a lower frequency than the first signal. In other words, it makes possible to cancel out an intermodulation distortion on a lower frequency side than the first signal generated by the intermodulation product of some frequency components in the first signal.

The invention claimed is:

1. An optical transmitting device of modulating an optical signal by a first signal and then by a second signal for transmission, the device comprises:
   an optical splitting means for splitting the optical signal modulated by the first signal into split optical signals, the optical signal modulated by the first signal including one or more harmonic distortions of the first signal;
   a cancellation signal generating means for generating a cancellation signal from one of the split optical signals, the cancellation signal including a frequency spectrum at least partially overlapped with a frequency spectrum of the second signal;
   a combining means for combining the second signal with the cancellation signal; and
   a modulating means for modulating the other of the split optical signals with the combined signal.

2. The optical transmitting device as set forth in claim 1, wherein the cancellation signal generating means comprises:
   a photoelectric converting means for converting the one of the split optical signals to an electrical signal;
   a filter means for extracting an electrical signal including the frequency spectrum at least partially overlapped with the frequency spectrum of the second signal from the converted electrical signal; and
   a phase adjustment means for adjusting a phase of the extracted electrical signal.

3. The optical transmitting device as set forth in claim 1, wherein the first signal is an FM batch converted signal.

4. The optical transmitting device as set forth in claim 3, wherein the second signal is a satellite broadcasting RF signal.

5. An optical transmission system comprising the optical transmitting device as set forth in claim 4 and an optical receiving device for receiving an optical signal transmitted via an optical path from the optical transmitting device, wherein the optical receiving device comprises:
   an optical splitting means for splitting the received optical signal to an optical signal containing the FM batch converted signal and an optical signal containing the satellite broadcasting RF signal;
   a first photoelectric conversion means for converting the optical signal containing the FM batch conversion signal split by the optical splitting means to an electrical signal;
   a demodulation means for FM demodulating the electrical signal converted by the first photoelectric conversion means;
   a second photoelectric conversion means for converting the optical signal containing the satellite broadcasting RF signal split by the optical splitting means to an electrical signal; and
   a downconverting means for down-converting the electrical signal converted by the second photoelectric conversion means.

6. An optical transmission system comprising the optical transmitting device as set forth in claim 4 and an optical receiving device for receiving an optical signal transmitted via an optical path from the optical transmitting device, wherein the optical receiving device comprises:
   a photoelectric conversion means for converting the received optical signal to an electrical signal;
   a filter means for separating the electrical signal converted by the photoelectric conversion means to the FM batch converted signal and the satellite broadcasting RF signal;
   a demodulation means for FM demodulating the FM batch converted signal separated by the filter means; and
   a downconverting means for down-converting the satellite broadcasting RF signal separated by the filter means.

7. An optical transmitting method for modulating an optical signal by a first signal and then by a second signal for transmission, the method comprises:

splitting the optical signal modulated by the first signal into split optical signals, the optical signal modulated by the first signal including one or more harmonic distortions of the first signal;

generating a cancellation signal from one of the split optical signals, the cancellation signal including a frequency spectrum at least partially overlapped with a frequency spectrum of the second signal;

combining the second signal with the cancellation signal; and modulating the other of the split optical signals with the combined signal.

8. The optical transmitting method as set forth in claim 7, wherein the generating step comprises:

converting the one of the split optical signals to an electrical signal;

extracting an electrical signal including the frequency spectrum at least partially overlapped with a frequency spectrum of the second signal from the converted electrical signal; and adjusting a phase of the extracted electrical signal.

9. The optical transmitting method as set forth in claim 7, wherein the first signal is an FM batch converted signal.

10. The optical transmitting method as set forth in claim 9, wherein the second signal is a satellite broadcasting RF signal.

11. An optical transmission method comprising steps of:

transmitting the optical signal modulated by the FM batch converted signal and the satellite broadcasting RF signal in accordance with the optical transmitting method as set forth in claim 10;

receiving and splitting the transmitted optical signal into an optical signal containing the FM batch converted signal and an optical signal containing the satellite broadcasting RF signal;

converting the split optical signal containing the FM batch converted signal to an electrical signal for demodulation; and converting the split optical signal containing the satellite broadcasting RF signal to an electrical signal for downconversion.

12. An optical transmission method, comprising steps of:

transmitting the optical signal modulated by the FM batch converted signal and the satellite broadcasting RF signal in accordance with the optical transmitting method as set forth in claim 10;

receiving and converting the transmitted optical signal to an electrical signal;

separating the converted electrical signal to a signal containing the FM batch converted signal and a signal containing the satellite broadcasting RF signal;

demodulating the separated signal containing FM batch converted signal; and downconverting the separated signal containing the satellite broadcasting RF signal.

13. The optical transmitting device according to claim 2, wherein the second signal is a satellite broadcasting RF signal.

* * * * *